US006296187B1

(12) United States Patent
Shearer

(10) Patent No.: US 6,296,187 B1
(45) Date of Patent: Oct. 2, 2001

(54) CCD-BASED BAR CODE SCANNER

(75) Inventor: Frank W. Shearer, Webster, NY (US)

(73) Assignee: PSC Inc., Webster, NY (US)

(*) Notice: Subject to any disclaimer, the term of this patent is extended or adjusted under 35 U.S.C. 154(b) by 0 days.

(21) Appl. No.: 09/438,382

(22) Filed: Nov. 12, 1999

(51) Int. Cl.[7] .......................... G06K 7/10; G06K 15/12
(52) U.S. Cl. .................... 235/462.41; 235/462.1
(58) Field of Search .................. 235/462.01, 462.11, 235/462.32, 462.41, 462.24, 462.1, 462.75

(56) References Cited

U.S. PATENT DOCUMENTS

| 3,774,014 | 11/1973 | Berler ................................ 235/61.11 |
| 4,057,784 | * 11/1977 | Tafoya ............................... 340/146.3 |
| 4,282,425 | 8/1981 | Chadima, Jr. et al. ......... 235/462.01 |
| 4,457,585 | 7/1984 | DuCorday ............................ 350/235 |
| 4,582,986 | 4/1986 | Stockburger et al. ............... 235/454 |
| 4,877,949 | 10/1989 | Danielson et al. ............. 235/462.01 |
| 4,939,355 | 7/1990 | Rando et al. ......................... 235/467 |
| 5,019,714 | 5/1991 | Knowles ............................... 250/568 |
| 5,252,814 | 10/1993 | Tooley ................................. 235/383 |
| 5,256,864 | 10/1993 | Rando et al. .................... 235/462.01 |
| 5,268,580 | 12/1993 | He ....................................... 250/566 |
| 5,298,728 | 3/1994 | Elliott et al. .......................... 235/463 |
| 5,308,966 | 5/1994 | Danielson et al. .............. 235/472.01 |
| 5,317,166 | 5/1994 | Tafoya ................................. 250/568 |
| 5,369,265 | 11/1994 | Adachi et al. ................... 235/462.01 |
| 5,382,783 | 1/1995 | Bremer ............................ 235/462.01 |
| 5,387,787 | 2/1995 | Waldron et al. ................ 235/462.01 |
| 5,396,054 | 3/1995 | Krichever et al. ............. 235/462.01 |
| 5,404,004 | 4/1995 | Sato et al. ............................. 235/463 |
| 5,414,250 | 5/1995 | Swartz et al. .................. 235/462.01 |
| 5,446,271 | 8/1995 | Cherry et al. .................. 235/462.01 |
| 5,463,214 | 10/1995 | Longacre, Jr. et al. ........ 235/472.01 |
| 5,481,097 | * 1/1996 | Tafoya ............................ 235/462.01 |
| 5,495,097 | 2/1996 | Katz et al. ...................... 235/462.01 |
| 5,517,018 | 5/1996 | Zheng et al. ....................... 250/208.1 |
| 5,521,366 | 5/1996 | Wang et al. .......................... 235/454 |
| 5,525,788 | 6/1996 | Bridgelall et al. ............. 235/462.01 |
| 5,567,934 | 10/1996 | Zheng et al. ...................... 235/237 R |
| 5,585,616 | 12/1996 | Roxby et al. ................... 235/472.01 |
| 5,635,699 | 6/1997 | Cherry ............................ 235/462.01 |
| 5,801,371 | 9/1998 | Kahn et al. ..................... 235/472.01 |
| 5,984,186 | * 10/1999 | Tafoya ............................ 235/462.24 |

FOREIGN PATENT DOCUMENTS

| 0 385 478 | 9/1990 | (EP) ................. G05K/7/10 |
| 2683929 | * 11/1991 | (FR) . |

* cited by examiner

Primary Examiner—Karl D. Frech
(74) Attorney, Agent, or Firm—Foley & Lardner

(57) ABSTRACT

A bar code scanning system for a conveyor system includes a CCD camera that writes data to a memory. Data is stored in the memory as a two-dimensional image at periodic time frames based on scanning by the CCD camera. Data is written out of the memory by a controller, to create a virtual X-scan pattern, that can be read and decoded by a decoder that is configured to decode X-scan patterns. Alternatively, the memory can be configured as a first memory region for receiving even pixel data, and a second memory region for receiving odd pixel data.

4 Claims, 17 Drawing Sheets

(NOT TO SCALE)

CCD-BASED BAR CODE SCANNER

BACKGROUND OF THE INVENTION

1. Field of the Invention

The present invention relates to a CCD-based bar code scanning system. In particular, the present invention relates to a CCD-based bar code scanning system that provides different types of scan patterns from stored bar code return data from one or more CCD cameras.

2. Description of the Related Art

Bar codes are used in a wide variety of applications for retrieving information, such as price, from objects. In this respect, bar code scanners are of widespread use in grocery stores and department stores, for both inventory control and for point-of-sale (POS) transactions.

A bar code normally includes several bar code characters. A bar code character is a group of lines (bars) and spacings that represent a single number or letter. A bar code symbol is a collection of several bar code characters which represent an identification of a particular object. The lines of the bar code can vary, for example, in a range from about ⅛" to 1" in height, and from about 1 to 50 mils in thickness. The spacings between the lines of the bar code symbol may be of various widths, with the variations in the spacing being one indication of the type of bar code characters making up the bar code symbol.

Typically, bar codes are read by a bar code scanner by illuminating the bars and spacings in a sequential manner, with the bars absorbing light and the background spacings reflecting light. This results in a pattern of reflections and nonreflections that is sensed by a light detecting circuit resident in the bar code scanner. The light detecting circuit provides an input to a digital processor, which interprets this input into a digital word.

A bar code label may be read by a scanner that detects reflected and/or refracted light from the bars and spaces that comprise the bar code characters. One conventional method of illuminating the bar code label is by the use of a scanning laser beam, in which case a beam of light sweeps across the bar code label, and an optical detector (such as a photo-diode detector) detects the reflected light. The detector generates an electrical signal having an amplitude determined by the intensity of the collected light.

Another conventional method for collecting return light from the bar code label is by the use of an array (commonly known as a charge-coupled device or CCD) of optical detectors connected to an analog shift register. In such a method, as with a scanning laser, an electrical signal is generated having an amplitude determined by the intensity of the collected light. In either the scanning laser method or the CCD method, the amplitude of the electrical signal has one level for dark bars and another level for light spaces. As the bar code label is scanned, positive-going and negative-going transitions in the electrical signal occur, signifying transitions between bars and spaces. Techniques are known for detecting edges of bars and spaces by detecting the transitions of the electrical signal. One such technique is described in U.S. Pat. No. 5,382,783, issued to Edward Bremer, assigned to PSC Inc., which is incorporated in its entirety herein by reference. Another such technique is described in U.S. Pat. No. 5,298,728, issued to Randy Elliott et al. assigned to Spectra-Physics Scanning Systems (now PSC Inc.), which is incorporated in its entirety herein by reference. Techniques are also known for determining the widths of bars and spaces based on the relative location of the detected edges and decoding the information represented by the bar code.

In order to scan a bar code, the bar coded items may be moved manually in front of the scanner or automatically on a moving conveyor belt. Alternatively, the scanner may be held by an operator and directed at a bar code. Some bar code labels may be "truncated" (that is, have short bars relative to the length of the label). Conventional scanning devices require careful operation to attain a high probability of a successful read and are difficult to use with truncated labels because of the difficulty of attaining proper orientation of the bar code label with respect to the scanner. Randomly oriented items on a conveyor belt must have very long bars relative to the length of the code in order to have a high probability of being read.

Handheld, single line scanners, either laser or CCD-based, require that an operator aim and orient the scanner relative to the bar code so that the scan line is substantially perpendicular to the bar code edges. Such operation requires some care on the part of the operator and reduces productivity. Furthermore, these devices are sensitive to label defects, as detection of bar and space edges is typically done along a single narrow scan line. To maximize the productivity of the operator, minimize stresses due to repetitive motions of the operators body, and minimize sensitivity to label defects, it is therefore desirable to read bar codes that may be positioned at any orientation relative to the scanning device.

Conventional POS scanning systems typically require an operator to handle each item (or handle a portable scanner) in order to orient the item to the scanner for scanning. A conveyor belt system may be used to reduce the amount of effort required. Current conveyor systems, however, have difficulty scanning items that have bar code labels on the bottom surface of objects on the conveyor. Consequently, the operator must position the item so the bar code label is not facing the top surface of the conveyor, or must take each item from a feed conveyor, scan it, and place it on a takeaway conveyor. Conventional systems generally do not allow scanning of all surfaces of the packages, requiring the operator to position the packages so the bar code is on the surfaces that can be scanned.

Various methods have been used to attempt to read a bar code label at any orientation to the scanner in a minimum number of passes. Thus, multi-line or complex-pattern laser scanners exist that can read bar codes over a range of orientations. In general, these devices utilize pattern-forming mirrors or holographic beam deflection elements, and are hence larger than other scanners and require more components as the scan pattern complexity increases. These scanners typically require a complex mechanism to sweep the laser beam in a predetermined pattern and therefore require additional and costly mechanical parts, increasing proneness to wear.

In another type of conventional scanner, a two-dimensional array of CCD elements is used to obtain an entire image of the bar code at one time. However, the drawback of these devices is that large amounts of memory are needed to store the image to be processed, and large amounts of computation are needed to extract the edge location data from the stored image. Further, complicated algorithms are necessary to determine the orientation and characteristics of the bar code label.

U.S. Pat. No. 5,446,271, issued to Gerald Cherry et al., and assigned to Spectra-Physics Corporation (now PSC Inc.), discloses a technique for creating a plurality of virtual scan lines based on stored image data from a two-dimensional or one-dimensional CCD camera. In this system, an optical sensor has a planar imaging region, which may correspond to an imaging region of a two-dimensional CCD camera, or which may correspond to a one-dimensional CCD camera with the second dimension created by raster input due to relative motion of the optical sensor with respect to a bar code label.

An exemplary bar code that may be scanned by the system as disclosed in U.S. Pat. No. 5,446,271 is shown in FIG. 1, where the bar code label 11 may be comprised of one or more smaller pieces 21 that are the minimum size necessary for decoding (i.e., minimum decodable pieces). A minimum decodable piece 21 of bar code label 11 has a height $H_L$ and a width $W_L$. When scanned, the bar code label 11 may not necessarily be oriented to the optical sensor at a perfectly flat angle, but may be inclined at an angle $A_L$ with respect to the optical sensor, as shown in FIG. 2. The result may be that the projection of the image of the bar code label 11 (or a minimum decodable piece 21 thereof is distorted when it hits the imaging region 13. The projection 20 of the label or piece image has a height H (the "apparent height") and a width W (the "apparent width"). If the relative dimensions $H_L$ and $W_L$ of the minimum decodable piece are known, and the angle of inclination $A_L$ is also known, the size of the projection 20 onto the imaging region 13 may be determined. U.S. Pat. No. 5,446,271 describes in detail the manner of determining the size of the projection 20. For example, universal product codes (UPC codes) are "over square" codes, in which the height of the bars in each piece of the code is greater than the width of the piece of the code.

The bar code label 11 also has a minimum element width $W_E$ of the bar and space elements comprising the label 11. The minimum apparent bar code element width $W_{MIN}$, which affects the preferred characteristics of the imaging region 13, may be derived from the minimum bar code element width $W_E$, as described in U.S. Pat. No. 5,446,271. The Cherry patent states that "ten or more pixels per element would be desirable in a UPC code reader."

In the system described in U.S. Pat. No. 5,446,271, when a CCD-based reader reads a particular region that it covers, only values from certain elements in the CCD array are stored in a memory, for later processing to determine if reflections from a bar code have been received. For example, FIG. 3A shows how horizontal scan lines are created, with only the "*" pixels being stored in a memory, and FIG. 3B shows how diagonal scan lines are created, with only the "*" pixels being stored in the memory. By this system, a plurality of different scan lines may be created and stored in the memory (see FIG. 4), with one of those scan lines (hopefully) property oriented so as to read a bar code that may be positioned in any particular orientation with respect to the laser scanning device and the CCD-based reader. Cherry also discloses an image acquisition unit positioned to receive return light from an object on a conveyor as that object passes over a gap between a first belt and a second belt The image acquisition unit is positioned in the gap, beneath the belts.

While the above-described Cherry patent is very useful in detecting bar codes at any particular angle, there are still issues with respect to memory size and CCD-based array size that could be improved upon, as well as orientation of the CCD-based reader itself with respect to a bar code being scanned.

SUMMARY OF THE INVENTION

It is an object of the invention to provide a system that can transform a two-dimensional array of stored image data from a CCD-based camera into an X-scanning pattern that is suitable for UPC codes and the like.

It is still another object of the invention to provide a system that can provide a timing capability to read a two-dimensional array of stored image data so as to create a plurality of scan lines from the stored image data.

These and other objects of the invention may be accomplished by an apparatus for scanning a bar code label. The apparatus includes a CCD camera configured to provide a linear array of scan output corresponding to a particular region currently being scanned. The apparatus also includes a memory for storing the linear array of scan output from the CCD camera. The apparatus further includes a controller connected to the CCD camera and configured to output the linear array of scan output to a particular region of the memory. The apparatus still further includes a signal processor connected to the memory and configured to output data from particular memory locations of the memory so as to create at least one virtual scan line. The apparatus also includes a decoder configured to determine if data corresponding to the virtual scan line corresponds to a real bar code. The virtual scan lines correspond to two 45 degree lines that intersect with each other so as to form an X-shape scan patter, as well as a horizontal line that provides redundancy data for the decoder.

The above-mentioned objects and other objects may also be accomplished by an apparatus for scanning a bar code label, which includes at least one CCD camera configured to provide a linear array of scan output corresponding to a particular region currently being scanned. The apparatus also includes a memory for storing the linear array of scan output from the at least one CCD camera, the memory being divided into a first memory region for storing even rows of pixel data and a second memory region for storing odd rows of pixel data with respect to pixels of the at least one CCD camera. The apparatus further includes a controller connected to the at least one CCD camera and configured to output the linear array of scan output to the memory. The apparatus still further includes a signal processor connected to the memory and configured to output data from particular memory locations of the memory so as to create at least one virtual scan line. The apparatus also includes a decoder configured to determine if data corresponding to the virtual scan line corresponds to a real bar code.

BRIEF DESCRIPTION OF THE DRAWINGS

The above-mentioned objects and advantages of the invention will become more fully apparent from the following detailed description when read in conjunction with the accompanying drawings, with like reference numerals indicating corresponding throughout, and wherein.

DETAILED DESCRIPTION OF THE PREFERRED EMBODIMENTS

Figure 1:
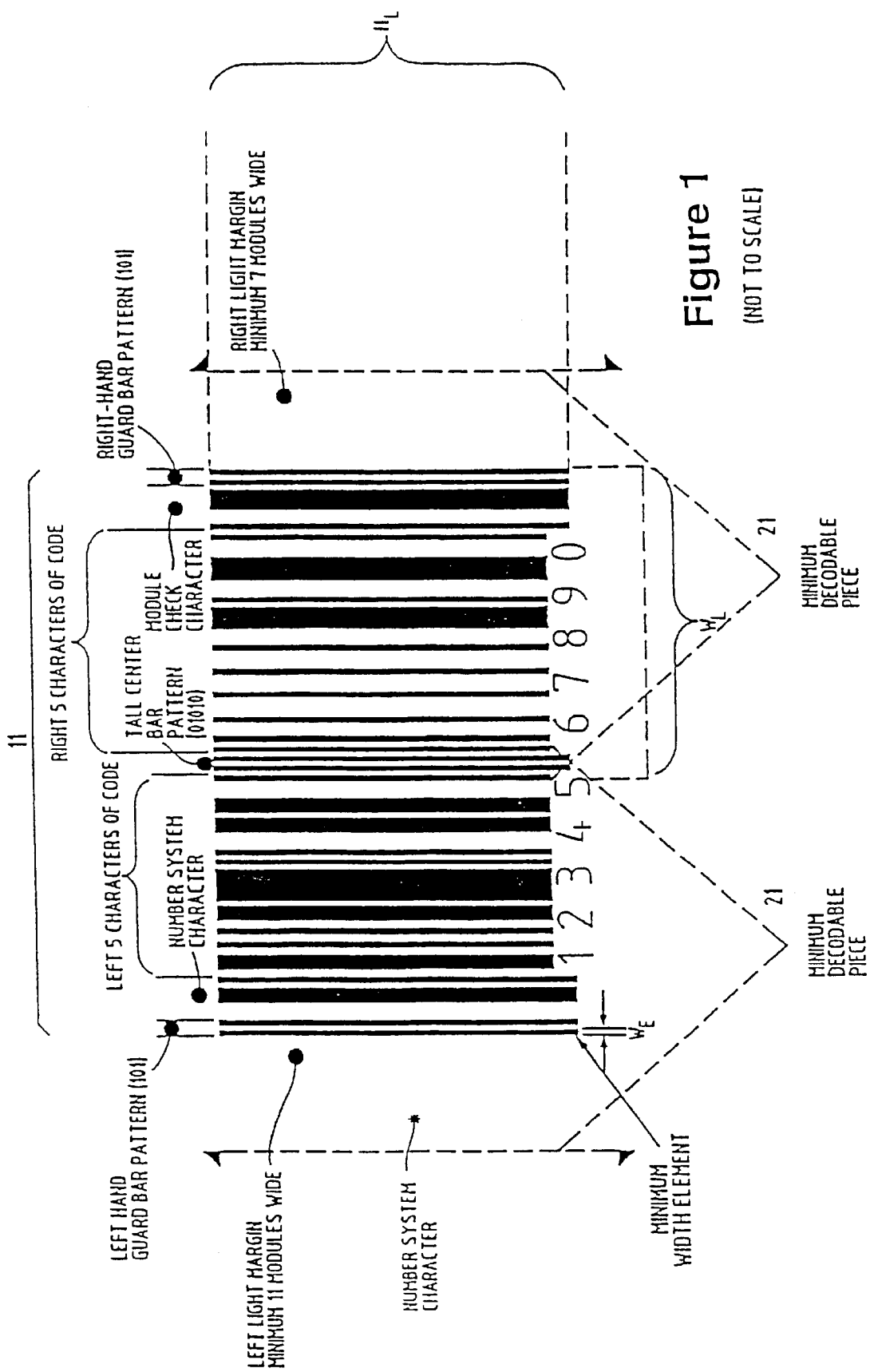
FIG 1 shows a typical bar code label.
Figure 2:
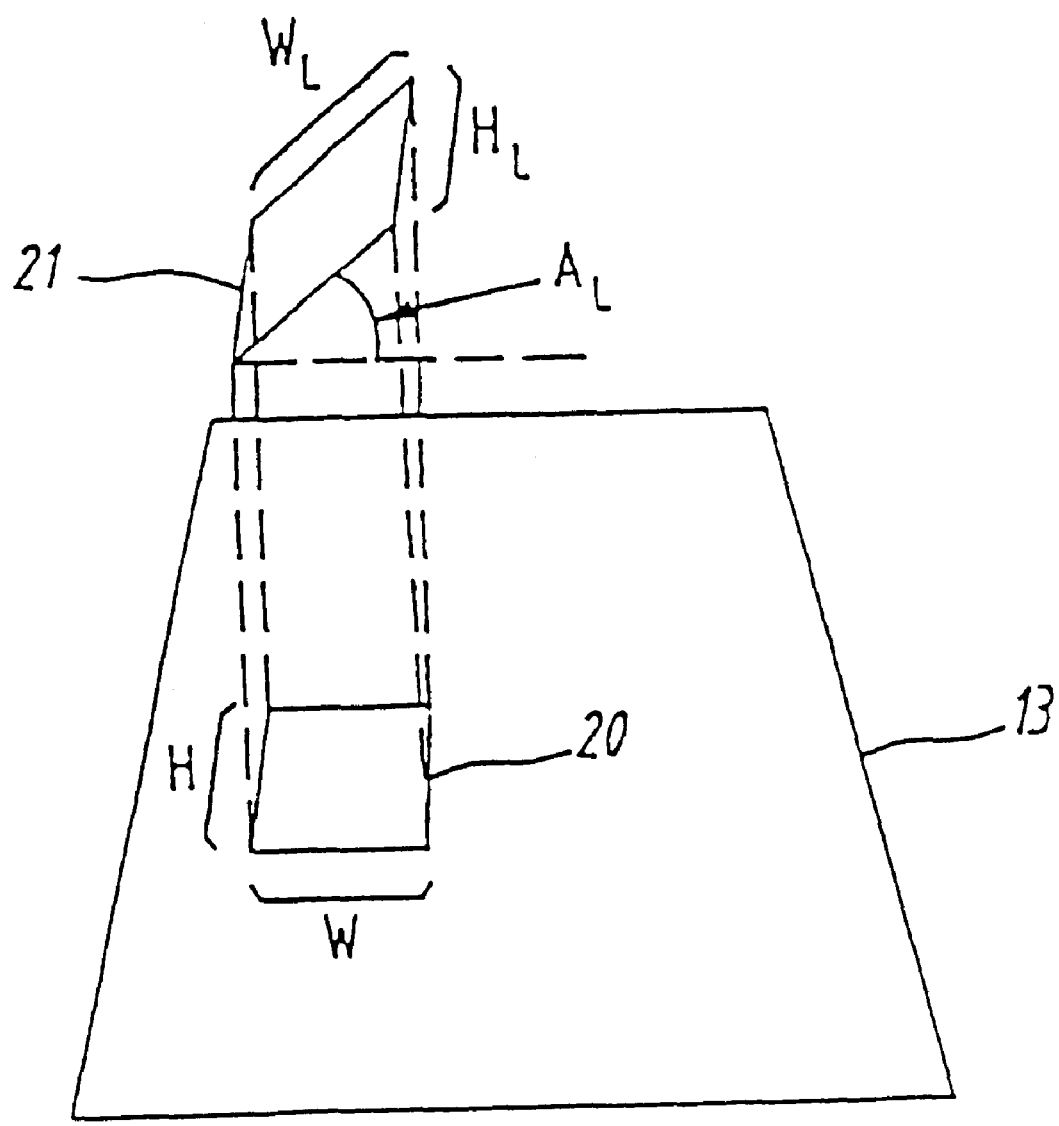
FIG. 2 is a diagram of an optical sensor positioned with respect to an imaging region.
Figure 3A:
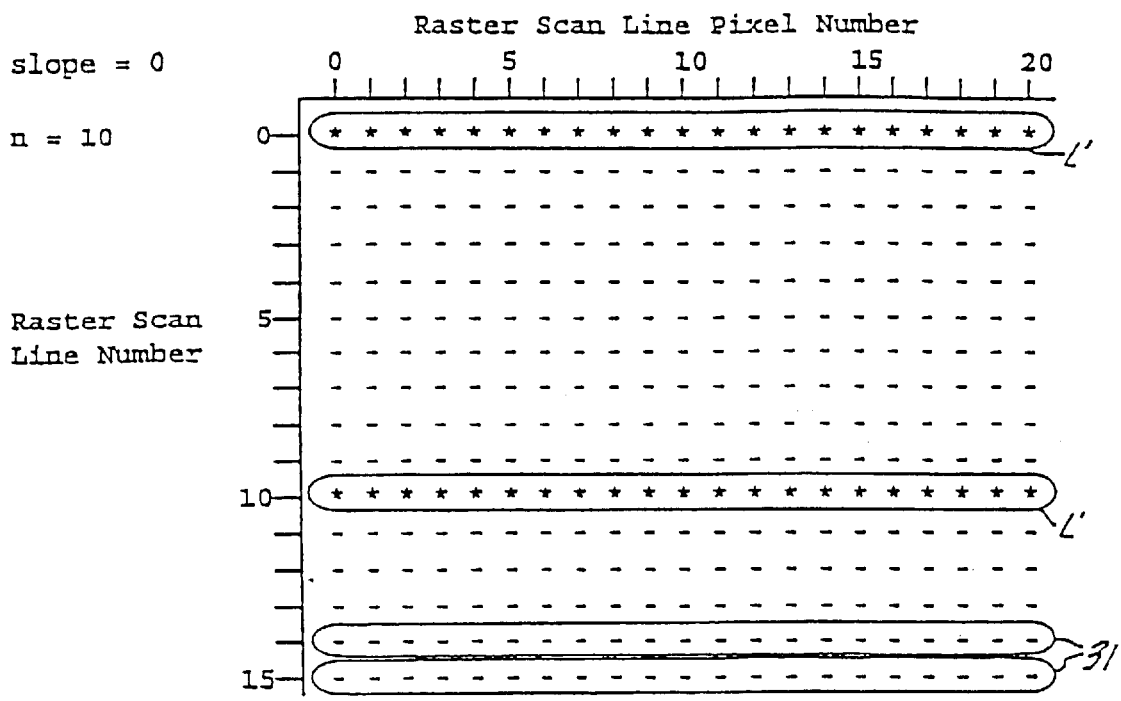
FIG. 3A shows how a virtual horizontal raster line may be created from stored image data in a conventional bar code scanning device.
Figure 3B:
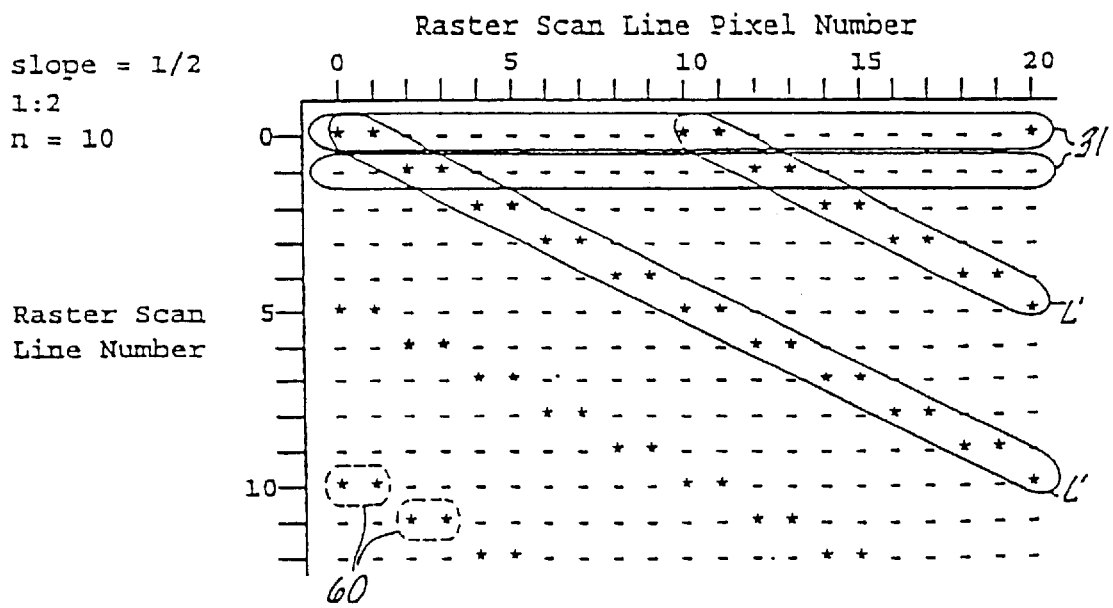
FIG. 3B shows how a virtual diagonal raster line may be created from stored image data in a conventional bar code scanning device.
Figure 4:
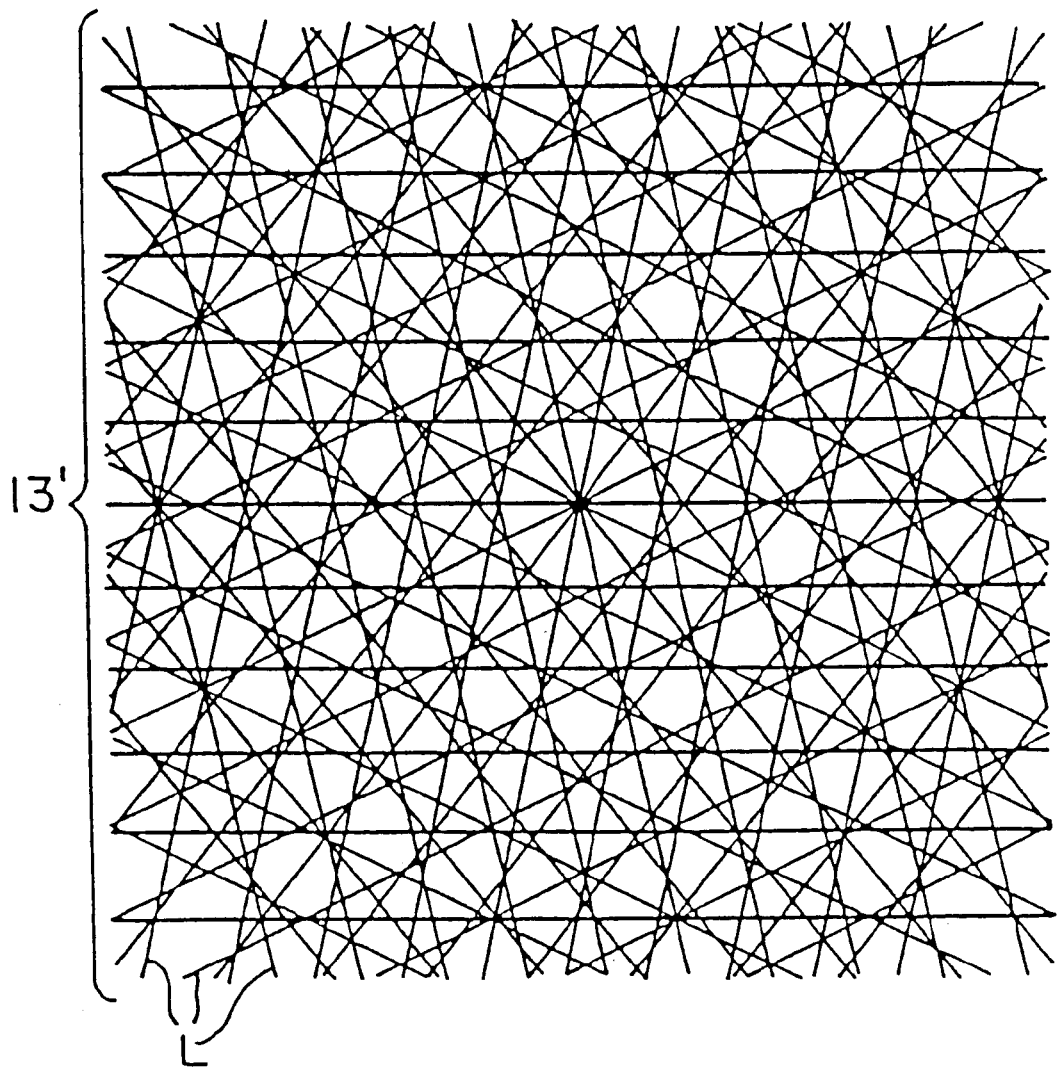
FIG. 4 shows a plurality of virtual scanning lines that may be created from stored image data, in a conventional bar code scanning device.
Figure 5:
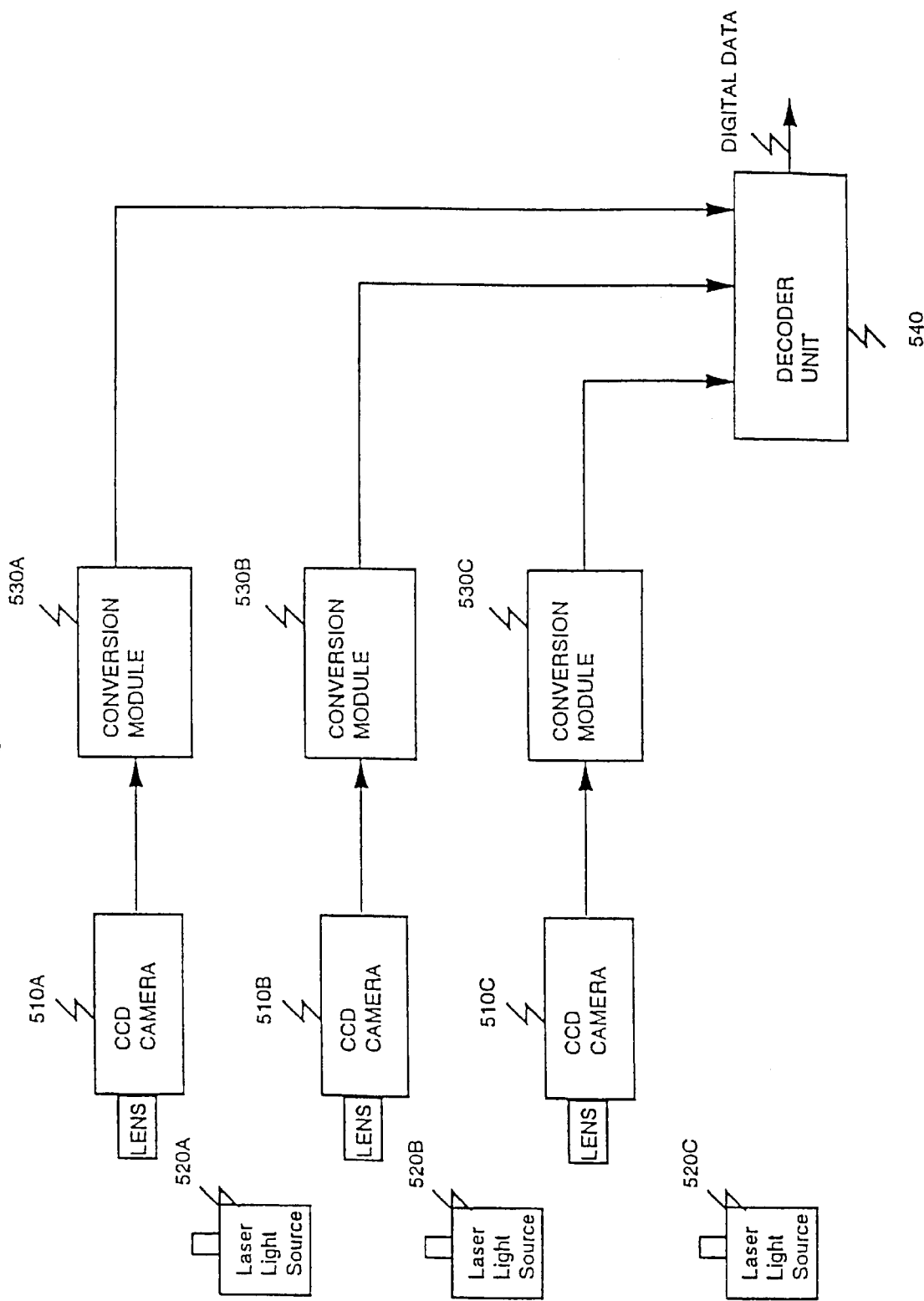
FIG 5 shows in block diagram form a bar code scanning device according a first embodiment of the invention.

Preferred embodiments of the invention will be described in detail below, with references to FIGS. 5 through 19 The described first embodiments, with all of its alternate configurations, are improvements of the first embodiment described in U.S. patent application Ser. No. 08/959,680, to Benny Tafoya, and assigned to PSC Inc. FIG. 5 shows in block diagram form a first embodiment of the invention, in which a plurality of CCD-based cameras 510A–510C are used to receive return light from a bar code label (not shown), where the return light is due to light directed onto the bar code label from corresponding laser light sources 520A–520C. Each camera 510A–510C has a lens associated with it as shown in FIG. 5. Each camera 510A–510C is connected to an associated conversion module 530A–530C, which receives the image data output from its associated camera, and which sends out only a certain portion of the stored data to a decoder unit 540. The decoder unit 540 performs decoding of the received data, so as to determine if a bar code label has been scanned or not Such a system may be utilized with a conveyor belt system (in which boxes having bar code labels pass by the system), or without a conveyor belt system, depending on the needs of a user of the system. For ease in explanation, the first embodiment of the invention will be described hereinbelow with reference to a conveyor belt system.

Figure 6:
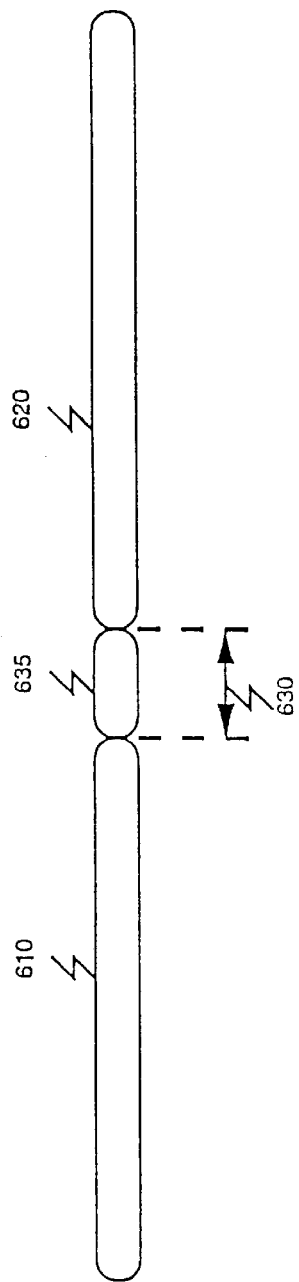
FIG. 6 shows a side view of the bar code scanning device according to the first embodiment, utilized with a conveyor system.

In FIG. 6, a first conveyor 610 and a second conveyor 620 are shown, with a gap 630 between an end of the first conveyor 610 and an adjacent end of the second conveyor 620. In the first embodiment, a component 635 is fitted into the gap 630, so that there is provided a substantially continuous surface between one end of the first conveyor 610 and the adjacent end of the second conveyor 620. The component 635 is of a construction such that it allows light to pass therethrough, such as a dear plastic or glass plate. Alternatively, the gap 630 may be configured of a small enough size (e.g., ½ inch in width), without having any component disposed within the gap 630. Due to the small width of the gap 630, items passing along the top surface of the conveyors 610 and 620 would not fall into the gap 630. Thus, even very small items can pass from the first conveyor 610, across the gap 630, and onto the second conveyor 620.

In conventional bar code scanning systems using conveyor belts, scanners may be disposed along five separate directions—i) in front of the conveyors, ii) behind the conveyors, iii) to one side of the conveyors, iv) to the other side of the conveyors, and v) above the conveyors. These systems, known as five-sided scanning systems, work well to detect and decode bar code labels that may be disposed at either: i) the front of a box on the conveyor, ii) the back of the box on the conveyor, iii) one side of the box on the conveyor, iv) the other side of the box on the conveyor, or v) the top of the box on the conveyor. However, if a bar code label is disposed on the bottom side of the box on the conveyor, it has to be manually repositioned by an operator prior to scanning the label, so that one of the five scanners may be able to detect the bar code label.

However, in the first embodiment, this manual movement by an operator is not required, since a scanner disposed beneath the gap 630 (or beneath the glass plate or plastic in the gap 630) can detect bar code labels along a sixth side. Thus, the first embodiment corresponds to a six-sided scanning system.

Assuming that the conveyors 610 and 620 have a width of approximately 30 inches, and assuming that the bar code labels have minimum-width bars and spaces of 15 mils, it is important to determine the number of CCD-based cameras that need to be disposed beneath the gap 630 so as to read a label on the bottom of a box positioned anywhere on the gap 630 (that is, anywhere on a length-wise direction on the gap 630) between the conveyors 610 and 620.

Figure 7:
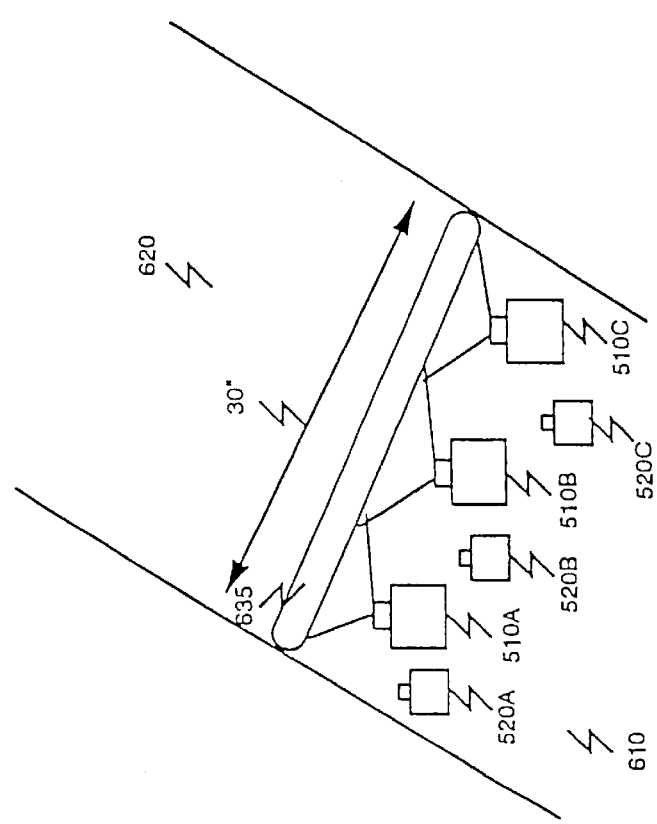
FIG 7 shows a view of the bar code scanning device according to the first embodiment in a widthwise direction, looking down from the top of a conveyor system utilized with the bar code scanning devices.

Assuming that one CCD-based camera has 2048=$2^{11}$ pixels, and assuming that it is desired to have at least three pixels per minimum width bar/space, then that one camera can detect return light over a 2048*15 mils/3=10.24 inches. Thus, three separate CCD-based cameras, spaced coaxially with respect to each other as shown in FIG. 7, are needed to cover the entire 30 inch-width of the conveyors 610 and 620. In this configuration, there is provided a laser light source 520A–520C for each of the CCD-based cameras 510A–510C. Each of the laser light sources 520A–520C is fixedly positioned in the gap 630 underneath the first and second conveyors 610, 620. Each of the laser light sources 520A–520C is positioned to output laser light through the gap 630 and onto a particular region 10" wide or so region on the gap 630 of the 30 inch-wide conveyor system. The light from the laser light sources 520A–520C reflects off of an object, and is received by a corresponding one of the CCD-based cameras 510A–510C.

Figure 8:
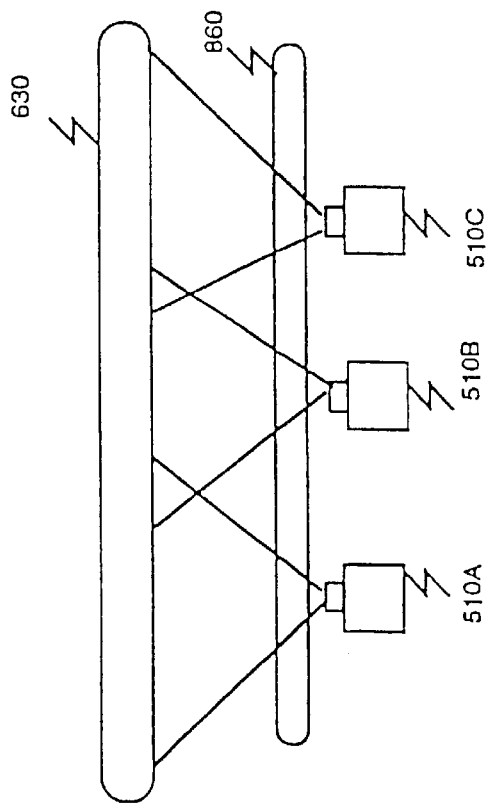
FIG 8 shows an alternative construction of the bar code scanning device according to the first embodiment, where optics are utilized.

In the above example, it is assumed that each pixel of a CCD-based camera is capable of receiving light from a 5-mil wide region. However, depending on the type of CCD-based camera and the distance that the camera is positioned with respect to the imaging region, this may not always be the case. In those situations, optics 860 are provided between the imaging region (that is, the top surface of the glass plate or plastic disposed in the gap 630) and the cameras, as seen in FIG. 8. These optics 860 have a level of magnification sufficient to provide the desired regional coverage for the pixels of the cameras. In an alternate configuration, the optics 860 may serve as both a magnifying and/or focusing device, as well as a cover plate for the gap region 630 (i.e., element 635 may comprise the optics). Preferably, the top surface of the glass plate or plastic disposed in the gap 630 has a hard coating, such as a ruby coating or other type of scratch-resistant coating, so as to resist scratching from objects as they pass over the glass plate or plastic from the first conveyor 610 to the second conveyor 620.

For example, if a camera has 1024 pixels, with each pixel capable of receiving light from a 2.5-mil wide region when the camera is positioned 1 inch away from the imaging region, then the optics 860 have to provide a "times 2" (×2) magnification, so as to provide a 5 mil width for each pixel. This 5 mil width corresponds to the three pixel per minimum bar/space requirement that was set as a requirement for this example of the system. In this instance, with the optics 860, one camera is capable of covering a region on the conveyor of 1024 pixels*2.5 mils/pixel (without optics magnification)*2 (optics magnification)=5.1 inches. Thus, six CCD cameras would be required in order to cover the entire 30-inch width of the conveyor. Similar to the optics used with the CCD cameras, additional optics may be used with the laser light source, as needed.

In the first embodiment, a requirement of three pixels per minimum width bar/space is utilized, but one of ordinary skill in the art will recognize that any number of pixels per minimum width bar/space may be utilized while remaining within the scope of the invention, as long as at least one pixel per minimum width bar/space is met Of course, the more pixels per minimum width bar/space one has, the better the information that is being sent to the decoder, so as to achieve a better probability of correctly decoding a bar code label. Also, having more than one pixel per minimum width bar/space is useful for properly decoding bar code labels that have print imperfections on them.

In the embodiment of FIG. 5, the decoder unit 540 is only capable of receiving X-scan patterns from one or more collector units, and so the conversion modules 530A–530C must reconfigure the twodimensional data from each of the cameras 510A–510C so as to provide the X-scan patterns to the decoder unit 540. One way of achieving this scan conversion would be to utilize a system similar to that disclosed in U.S. Pat. No. 5,446,271. In the present invention, however, all of the pixel data is read into a memory within each of the conversion modules 530A–530C, but only data from predetermined regions of the memory are outputted to the decoder module 540. Since the X-scan pattern corresponds to two 45-degree diagonal lines oppositely oriented, one diagonal line of the X-scan pattern would correspond to the first element in the first row of an n-by-n memory (that is, a memory capable of storing $n^2$ bits of data), the second element in the second row of the memory, ..., the $n^{th}$ element in the $n^{th}$ row of the memory. Similarly, the other diagonal line of the X-scan pattern would correspond to the $n^{th}$ element of the first row, the $(n-1)^{st}$ element of the second row, ..., the first element of the $n^{th}$ row. A corresponding X-pattern is provided to the decoder unit 540 by each conversion module.

Figure 9:
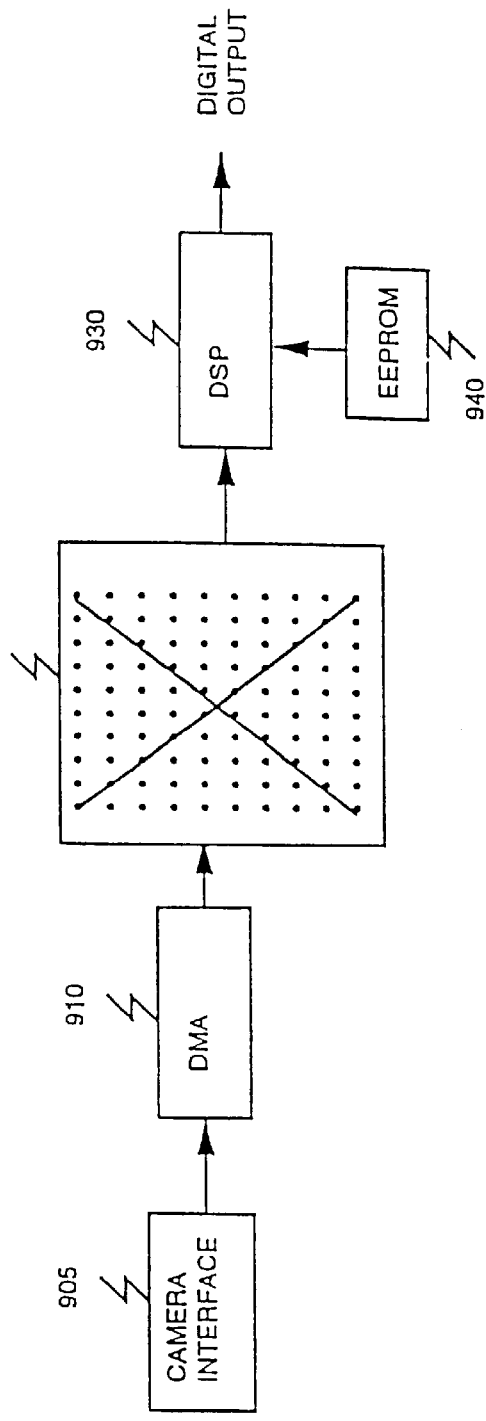
FIG. 9 shows in block diagram form the details of a conversion module used in the first embodiment.

A block diagram of a conversion module, such as 510A, is shown in FIG. 9. A camera interface unit 905 is coupled to the associated camera (either 510A, 510B, or 510C). A direct memory access controller (DMA) 910 provides the control for sending the pixel image data from the camera interface 905 to a memory 920. The memory 920 is configured as an n×n memory, having $n^2$ memory locations (e.g., 10×10=100 memory locations). In the first embodiment, memory 920 is a random-access-memory, and is configured as a 2048-word by 2048-word memory, which provides a symmetric block corresponding to a 10.24" square. The data corresponding to the two diagonal lines making up the X-scan pattern are read by a digital signal processor (DSP) 930 that is connected to the memory 920. DSP 930 reads the corresponding X-scan pattern data from predetermined memory locations in the memory 920 by using a program retrieved from an EEPROM 940. DSP 930 provides the coordination between the camera data and downloads to the decoder unit 540. The program stored in EEPROM 940 provides the means by which the DSP 930 retrieves the proper memory locations from the memory 920, so as to output X-scan pattern data to the decoder unit 540 (see FIG. 5).

The basic function of the system according to the first embodiment is to convert the sequential raster reads from the camera to an X pattern format familiar to the decoder unit 540. The array in the memory 920 will model a picture of what has passed by the camera for a finite period of time. It will also be cyclical, thereby causing the imaged barcode to traverse through the diagonal read elements in the array. Basically, the process involves writing into memory 920 in sequence what the camera images, and then at predefined periods reading the diagonals of the array. The whole process thus involves proper timing in reading and writing to/from memory 920.

The writing into memory 920 (camera data) will begin at an initial point (0), and will continue until the end of the array, $2^{24}-1$ words. At this point, the writing will restart at the initial point again. Each row is comprised of 2048 words along with a row pointer that is updated after each row is completed. The row pointer becomes effectively the end of the memory array. The row pointer also functions as an element for generating the X-pattern, since it will effectively fold the memory addressing around at the lower and upper limits, forming the memory array into a circular buffer.

The reading of the diagonal elements will simulate the X pattern for an omnidirectional scanner, for example, top left to bottom right, followed by top right to bottom left. This is achieved through subtraction and addition of one memory address to both the column and row element. For example, the first diagonal element can be generated by adding 2048+1 to the last memory address starting at the row pointer. This is repeated 2047 times for each diagonal element. The other diagonal is generated by 2048−1.

Assuming a writing rate of 125 $\mu$seconds per row (2048 words) and 1 millisecond for each X pattern (4096 words), the ratio for input data rate to output date rate is 4:1. Therefore, for each four writes to the array, there will be one read to the decoder unit 540.

The DSP 930 may be a model TMS320C3x, any other type of digital signal processor, a microprocessor, or a digital circuit of counters, registers, and control logic. Model TMS320C3x is a 32-bit processor, with the capability of addressing 16M words. Should the raw camera video be digitized for eight bits, the TMS320C3x can handle four cameras simultaneously; Each row is comprised of 2048 32bit words. Each word is comprised of four 8 bit pixel values for corresponding pixels from 4 separate cameras. For example, the $10^{th}$ word of any given row is as follows: bits 0–7 are the 8 bit value of the $10^{th}$ pixel of Camera 1, bits 8–15 are the 8 bit value of the $10^{th}$ pixel of Camera 2, bits 16–23 are the 8 bit value of the $10^{th}$ pixel of Camera 3, and bits 24–31 are the 8 bit value of the $10^{th}$ pixel of Camera 4.

In the first embodiment, lasers are provided as the light emitting sources 520A–520C, since a white light source (or sources) would typically not suffice for illuminating a bar code label positioned upwards with respect to a light emitting and light receiving unit. A laser source may be conveniently used within the small gap region between conveyors and has a better signal-to-noise ratio than a white light source (such as a lamp).

Alternatively, an array or arrays of high intensity Light Emitting Diodes (LEDs) can be used as light emitting sources 520A–520C.

As explained above, each conversion module unit 530A–530C converts the sequential raster read from its associated CCD camera 510A–510C to a diagonal format familiar to the decoding unit 540. In the first embodiment, the decoding unit 540 is a 990 E-box manufactured by PSC Inc. The memory array 920 stores an image of what has passed by the CCD cameras 510A–510C for a finite period of time. The memory array 920 is cyclically updated at the camera frame rate. Because the X pattern read out of memory starts at the row pointer, the imaged barcode essentially traverses through the diagonal read elements in the memory array 920.

Figure 10:
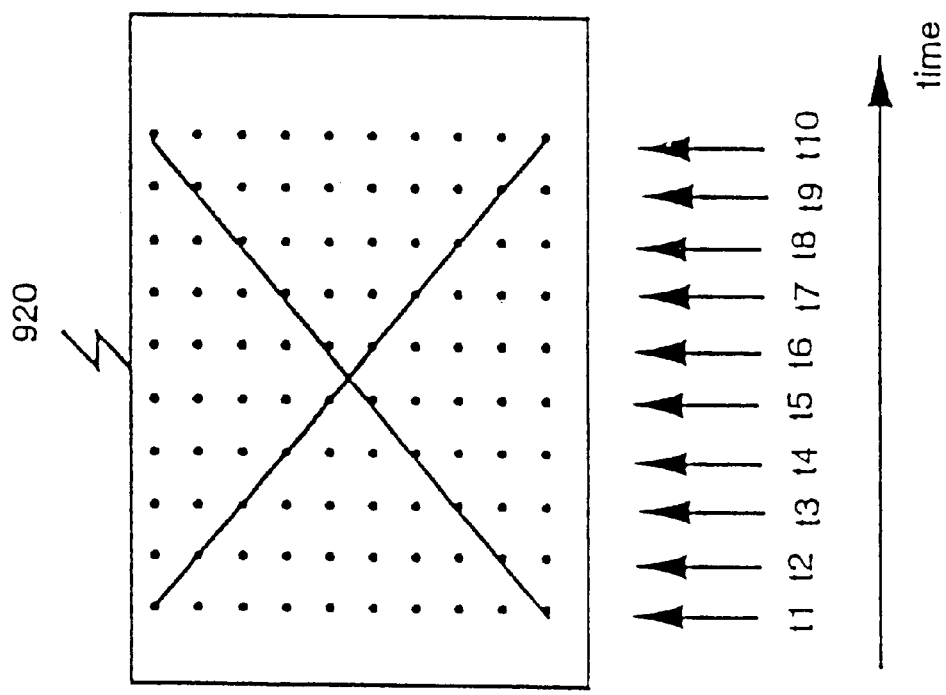
FIG. 10 shows the timing sequence of how data is written into a memory in the conversion module used in the first embodiment.

In the first embodiment, as shown in FIG. 10, pixel elements from the CCD camera 510A–510C are written into a first region (shown as a first column) of the memory 920 by the DMA 910 at a first sampling instant in time $t_1$. In the discussion given hereinbelow, it is assumed that each CCD element corresponds to one pixel, with one bit assigned for each pixel. Of course, one of ordinary skill in the art will recognize that the system according to the invention is operable with a system employing more than one pixel per CCD element and/or more than one bit assigned for each pixel.

For a one-dimensional CCD camera, at a particular sampling instant in time, one entire column of the memory 920 is written into. At a second sampling instant in time $t_2=t_1+\_\_t$, a next column (disposed just to the right of the previously-written-into column in FIG. 10) is written into by the DMA 910. This procedure is continued until the nth (last) column of the memory 920 is written into by the DMA 910 at the nth sampling instant in time $t_n=t_1+n^*\_t$. At this point, the pixel data corresponding to the (n+1)-st instant in time $t_{n+1}$ is written over the data from the first instant in time $t_1$, the pixel data corresponding to the (n+2)-st instant in time $t_{n+2}$ is written over the data from the second instant in time $t_2$, etc.

By this operation, the memory array is formed into a circular memory buffer that is cyclically updated at the frame rate of the camera.

Another important feature of the present invention is to have a memory system that is fast enough to provide for a particular system requirement, such as a conveyor speed. As an example, assume that the a system requires the reading of 15 mil bar codes moving on a conveyor at 200 feet per minute (fpm). The linear array camera to be used would need to be designed to operate at a clock rate of at least 16.4 MHz for a linear array of 2048 pixels.

For a conveyor belt speed of 200 ft/min=40 inches/sec, and for a scan resolution of 5 mil, we get:
  40 in/sec/5 mil=8000 scans/second, which is equivalent to a scan rate of 125 microseconds/scan.
  2048/125 microseconds=16.4 MHz for the clock rate required for the linear array camera.

This also defines the memory array size, 2048×2048 bytes, or a total of 4.2 Mbytes. By taking the reciprocal of the clock rate (60 nsec), we are provided with the memory speed requirement.

The output of the module needs to comply with the requirements of the decoder unit, which we will assume has a scan rate of 1 msec per channel. Since the diagonals of the memory array are being read out, the total bytes are:
  2×2048=4096 bytes to be read every 1 milliseconds. This is equivalent to a dock rate of 4.096 MHz, or a minimum timing resolution of 244 nsec.

Figure 11:
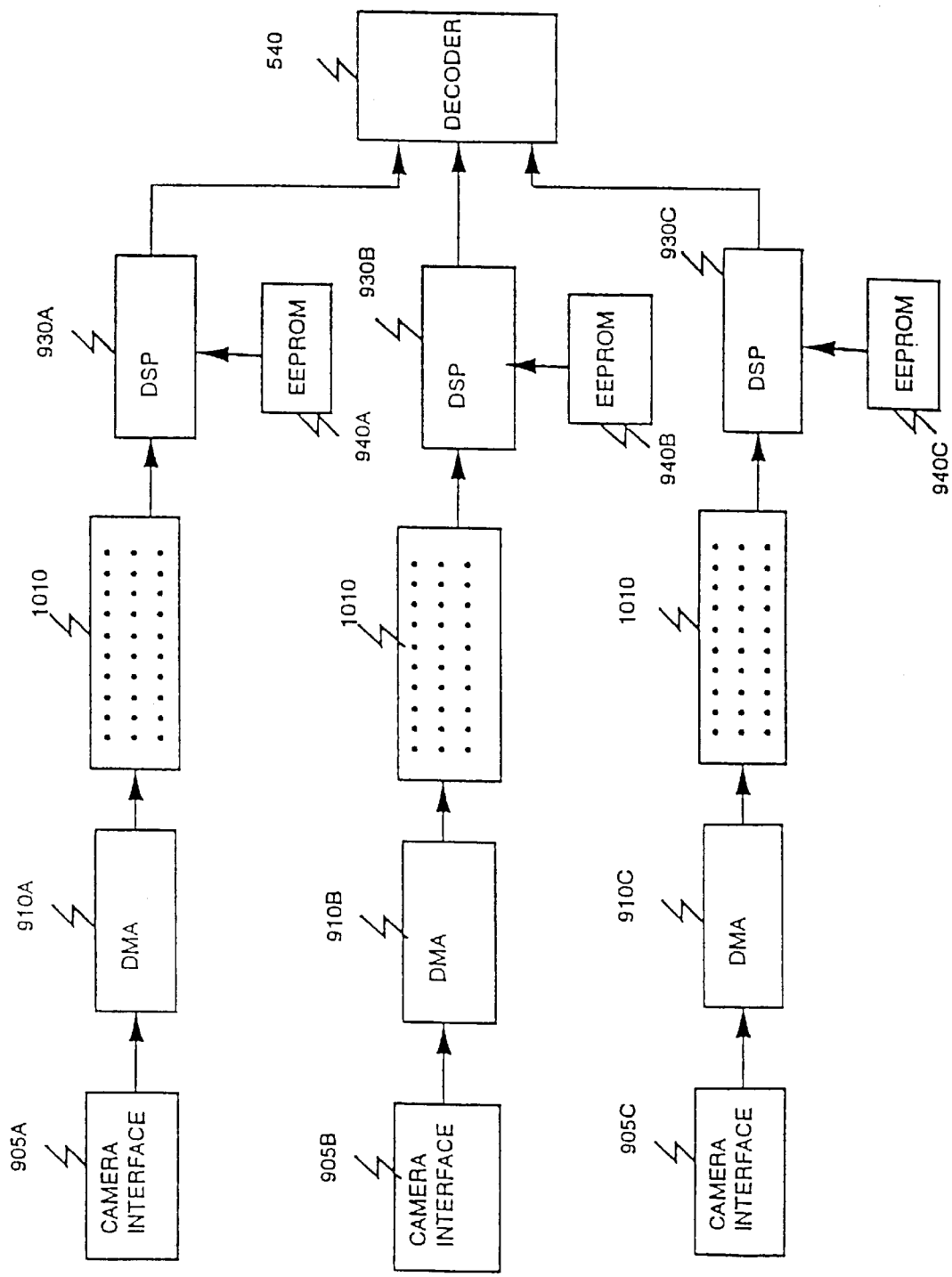
FIG. 11 shows an alternative configuration of the conversion module used in the first embodiment.

While the memory 920 is depicted as a single memory in FIGS. 9 and 10, it may alternatively correspond to a plurality of memories 1010, 1020, 1030, as shown in FIG. 11, with memory 1010 receiving pixel image data from the first camera 510A, memory 1020 receiving pixel image data from the second camera 510B, and memory 1030 receiving pixel image data from the third camera 510C (where three cameras are needed to cover an entire width of a conveyor belt, for example). Each memory corresponds to a particular region of a total memory 920 that corresponds to the combination of the memories 1010, 1020 and 1030, as shown in FIG. 10. Memory 1010 would have read therein the top portions of the "X-scans", memory 1020 would have read therein the middle portions of the "X-scans", and memory 1030 would have read therein the bottom portions of the "X-scans". Each memory 1010, 1020 and 1030 has its own associated DMA and DSP, in a manner shown in FIG. 11, to allow for parallel processing of the image data from the CCD cameras 510A–510C, which is output to the decoder unit 540 in a faster manner than if only one memory was shared by the three cameras 510A–510C.

In the first embodiment, the number of cameras required to cover a particular image region is preferably determined based on a 5% overlap region between cameras, but any particular value can be utilized while remaining within the scope of the invention as described herein.

Figure 12:
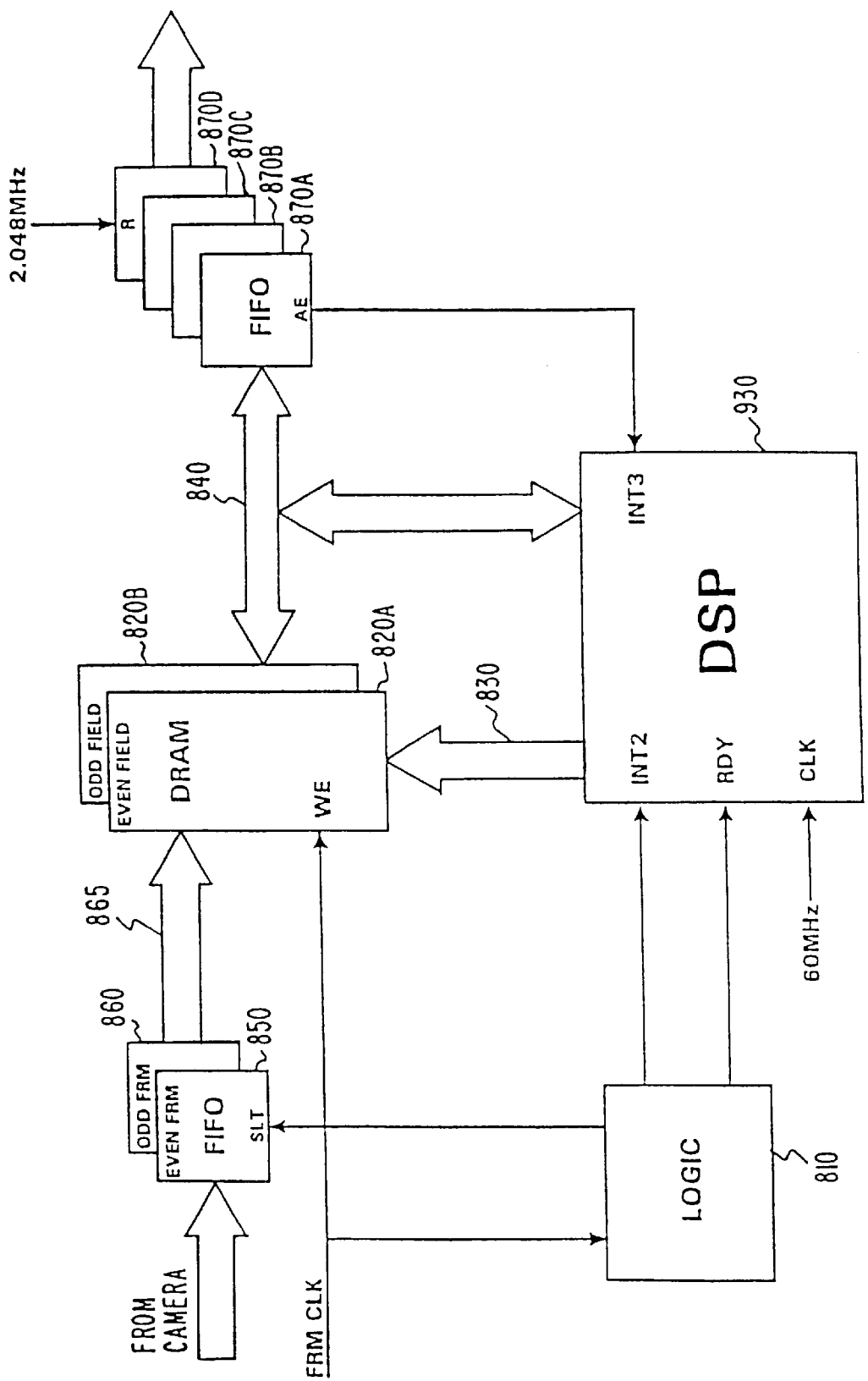
FIG. 12 shows in block diagram form a raster conversion implementation used in the first embodiment, that is capable of handling output four line scanning cameras at one time.

FIG. 12 is a block diagram of a raster conversion implemention that may be utilized in the first embodiment. In FIG. 12, DSP 930 receives a interrupt signal from logic circuit 810, where the interrupt signal is based on a frame clock signal received by logic circuit 810. DSP 930 also receives a high speed clock, which corresponds to a 60 MHz clock in FIG. 12. DSP 930 outputs addresses to a first and a second Random Access Memory (RAM) 820A, 820B on address bus 830, based on an X pattern to be read out of RAMs 820A, 820B via data bus 840. The output of CCD Camera is initially stored in an even frame FIFO 850 and an odd frame FIFO 860. The camera data is output to RAMs 820A, 820B via a bus 865. RAM 820A receives the even frames from even frame FIFO 850, and second RAM 820B receives the odd frames from odd frame FIFO 860. RAMS 820A and 820B are written into at a rate determined by the camera clock rate. The outputs of first and second RAMS 820A, 820B are sent to FIFOs 870A–870D, and each FIFO is capable of supporting a separate line scanning camera. In an exemplary configuration, each FIFO is clocked at a rate of 4.096 MHz, and each FIFO provides an interrupt signal to DSP 930. FIFOs 870A–870D provide an X-pattern of bar-code data to decoder unit 540 (not shown in FIG. 12).

Figure 18:
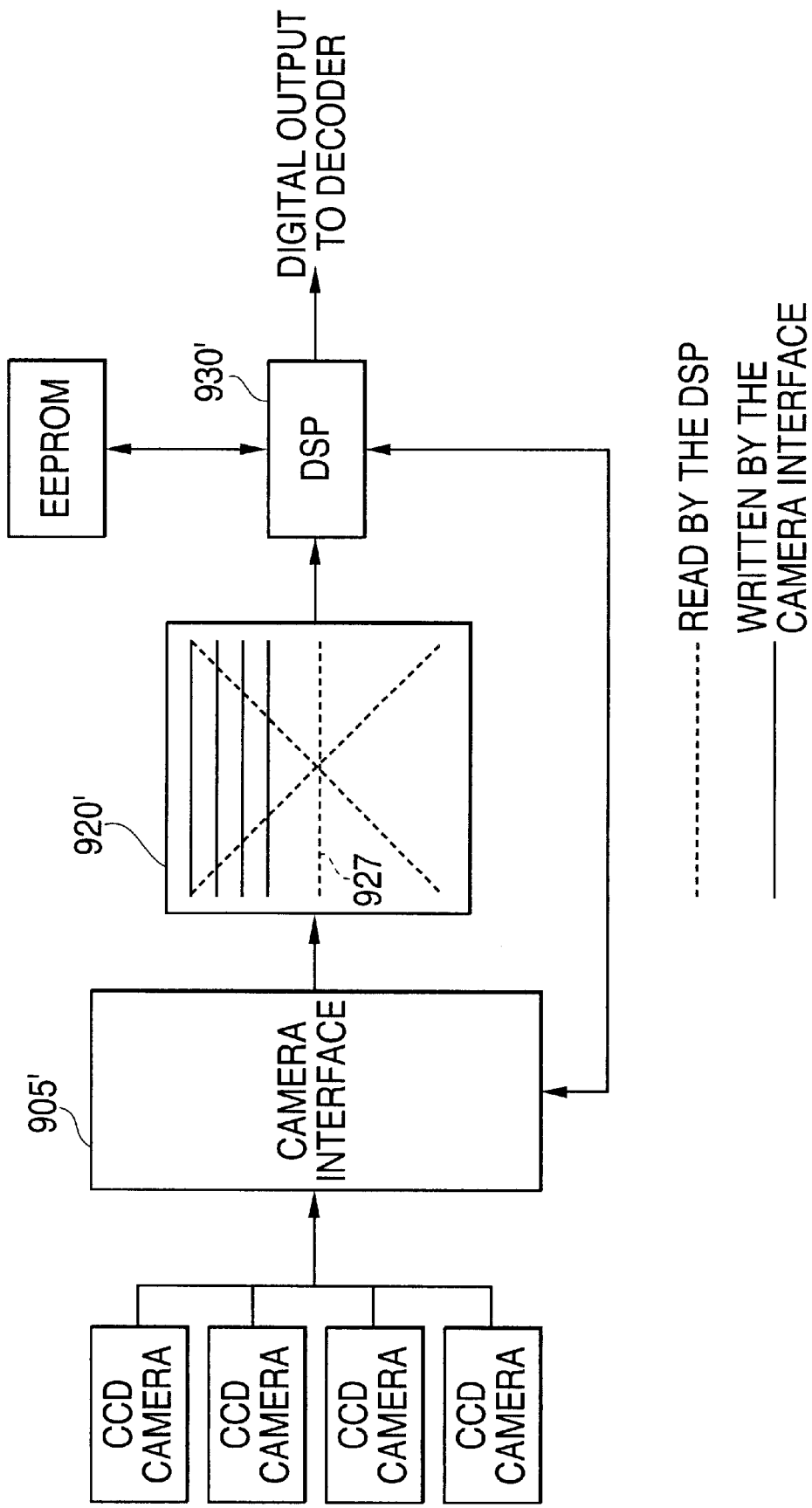
FIG. 18 shows in block diagram form an alternative configuration of be first embodiment and FIG. 19 shoes in block diagram form another alternative configuration of the first embodiment, which uses odd and even FIFOs.

In an alternative configuration of the first embodiment, as shown in FIG. 18, the DSP reads out the diagonals of the stored array of data in the memory 920' at predefined periods, and it also reads a midpoint row of the stored array of data in the memory 920'. Like the first configuration described above, the array of data in the memory 920' corresponds to a picture of what has passed by the camera for a finite period of time. The memory 920' is circular, thereby causing the imaged barcode to traverse through the diagonal and horizontal read elements in the array.

Data is written into the memory 920' in the sequence at which the camera images, and that data is then read out of the memory 920' in a particular order, thereby obtaining an X-scan pattern. One row of video data is written into the memory array at an initial point (row 0). Each new row is written sequentially into the memory 920' and the process continues up to the end of the array (row 2047 for a memory comprised of 2048 32-bit words, for example). When the memory array has been filled, subsequent rows will be written starting at the initial point that was written to in the memory 920'. That is, row 2048 will overwrite row 0, row 2049 will overwrite row 1, and so on. Of course, the overwritten row (or rows) will have already been read out of the memory before the overwriting takes place. This results in a circular buffer that is 2048 rows in total, for a memory comprised of 2048 words by 2048 rows. In this alternative configuration, each CCD camera module 902 has a 2048 pixel linear array CCD camera and a visible laser diode illumination module, so as to be matched to the data storage capacity of the memory 920'.

The function of the camera interface 905' is to provide synchronization between the CCD cameras and the coordinate writing video data to the memory 920'. The memory 920' is a symmetric memory block that corresponds to video image arrays. The digital signal processor 930' coordinates the transfer of video data from the memory 920' to an output section (not shown). The digitized data stream is sent from the output section to a barcode detector, where that barcode detector is designed for use with a traditional scanner (x-pattern) optics unit. The digital signal processor 930' is connected to the camera interface 905' by a bidirectional communications path, whereby the camera interface 905' informs the digital signal processor 930' about where it is currently writing to in the memory 920' (e.g., which row of the memory is currently being written to). The digital signal processor 930' provides a startup synchronization signal to the camera interface 905' via its signal line to the camera interface 905'. In particular, the camera interface 905' is not allowed to write to the memory 920' until it is receives the startup synchronization signal from the digital signal processor 930', during which time dummy data is read out of the memory 920' and stored in FIFOs (not shown), so as to set up the system for receiving real data.

The reading of the diagonal elements of the array simulate the X-pattern of a scanning laser-based optical unit, top left to bottom right, followed by bottom left to top right. The additional horizontal row 927 read across the memory array is for increased redundancy, and provides for a more accurate bar code detection. While this alternative configuration of the first embodiment has been described with respect to a memory having 2048 words by 2048 rows, other sizes may be utilized, while remaining within the scope of the invention.

Another aspect of the first embodiment allows for alternative reads through the array. A camera frame is equivalent to one complete cycle of camera operation. One cycle of camera operation is defined here as beginning at the clock pulse that indicates the first pixel value of the array is on the cameras external data bus and concluding at the end of the clock cycle just prior to the clock pulse that would begin the next cycle of camera operation.

As previously stated, the memory array is addressed as a circular buffer, cyclically updated at the frame rate of the camera(s). A row pointer containing the address of the oldest row of data is updated after the start of each new write of frame data to the array. In the example of a memory array formed of 2048 words by 2048 rows, if one considers the row pointer, regardless of the physical address, to be pointing at Row 0 of the circular memory array, then the newest frame data is always in Row 2047 of the array. The key features of this circular array are that the newest frame data overwrites the oldest data, that the logical beginning and the logical end of the array are adjacent to each other, and that the pattern extracted from the array always starts at the same logical address (e.g. Row 0).

The memory array in which the camera frame data is stored and from which the scan pattern is extracted can be viewed as formed of rows and columns. Each row contains pixel values for a single frame of camera data. Each column contains the value for an individual pixel element of the sensor array. For example, the $10^{th}$ word of row 2 and the $10^{th}$ word of row 200 represent the pixel value for the $10^{th}$ element of the sensor array at different frame times.

The memory array that is formed by writing consecutive frames of camera data into a memory region has both horizontal and vertical resolution. The horizontal resolution is the dimensional relation of pixel to pixel within a single frame of camera data and will be viewed in this definition as running perpendicular to the direction of belt travel. The vertical resolution is the interval between the start of a frame of data to start of the next frame and will be viewed as running parallel to the direction of belt travel.

The horizontal resolution is determined by the size of the cameras sensor elements, the pitch of those elements, the intervening optics, and the distance from the sensor elements to the focal point of those optics. The horizontal resolution can be viewed as the data stored in the columns of the memory array. The vertical resolution of the memory array is dictated by the belt speed and the camera frame rate (e.g. 500 FPM (100 IPS)×50 usec per frame (20 kHz frame rate)=0.005"resolution). The vertical resolution can be viewed as the data stored in the rows of the memory array.

The performance of the scanning system can be enhanced by extracting a pattern more complex than an X from the memory array. In addition to the diagonals of the array, both horizontal (row) and a vertical (column) reads can be performed as part of the sweep. This would increase the pattern coverage of the memory array and improve the redundancy of the sweep pattern.

The horizontal leg of the pattern can be formed by reading out a row of the memory array. Any row of the array can be used, as long as it is the same logical row each time the pattern is extracted. In FIG. 18, it is shown as being a row midway between the extents of the logical array. The pattern extracted from the array can contain more than one horizontal leg.

Figure 19:
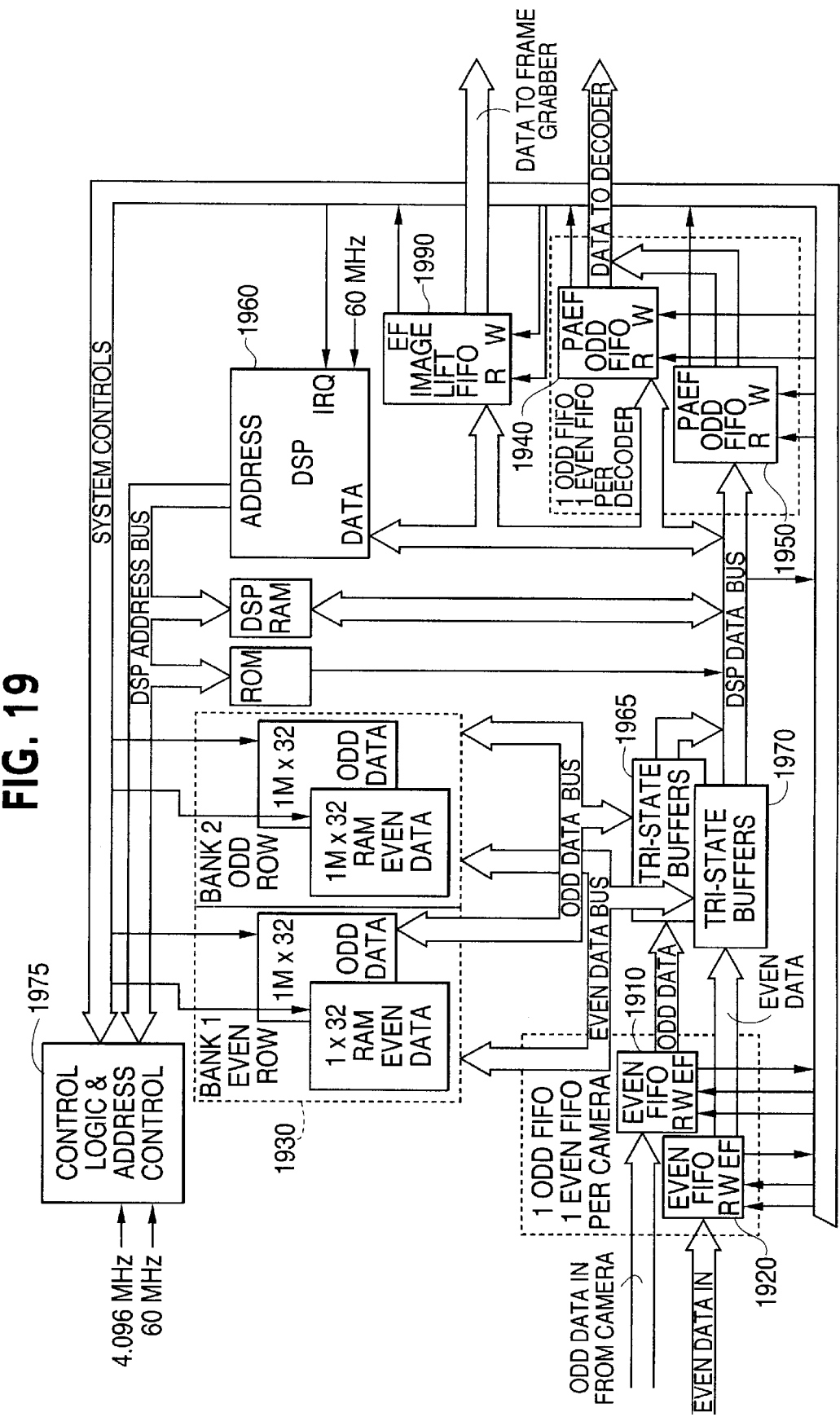

Additionally, the horizontal component of the pattern can be written to a FIFO or FIFOs for the purpose of reconstructing an image of what has passed by the camera for a finite period of time (image lift FIFO 1990 of FIG. 19). The output of the image lift FIFO 1990 would be sent to an external frame grabber which would build the image. For increased vertical resolution, additional horizontal reads from the memory array can be performed by the DSP during the periods when it is not processing data for scan patterns. These extra horizontal reads need not be sent to the even and odd output FIFOs.

A vertical leg of the pattern can also be extracted from the memory array for each sweep pattern. Unlike the horizontal and diagonal legs of the pattern, the column address would be changed with each subsequent pattern cycle. The effect will be akin to rastering a scanning laser across an area the width of the image contained within the memory array, parallel to the direction of belt travel. It is desirable, but not required, for the vertical read leg of the pattern to shift through the memory array twice during the time required for the newest row of frame data to become the oldest.

For example, assume a scanning system with a frame rate of 125 microseconds and a memory array of 2048 words per row and 2048 rows. It would take 256 milliseconds to completely overwrite the memory array (2048 rows× 0.000125 sec.=0.256 sec). If a scan pattern is read from the array every 1 millisecond then 256 patterns would be completed in 256 milliseconds. If the vertical leg is read out starting in Row 0, adding 16 to its starting address each time it is read out would raster the vertical leg across the columns of the array 2 times during the time it takes to overwrite the array (2048 pixels per row/256=8 pixels for 1 pass across array, 8×2=16 pixels for 2 passes across the array). This will offer further redundancy and improve the ability of the scanner to read barcodes. The pattern extracted from the array can contain more than one vertical leg.

As an alternative implementation of the first embodiment, one can use a plurality of linear array cameras, such a 4 cameras, each with 2048 pixels.

As shown in FIG. 19, the odd and even pixels sent from the camera are written to separate odd and even input FIFOs 1910, 1920. The output of these FIFOs are written to the memory array 1930. The memory array 1930 is configured as two banks; Even Row bank 1 and Odd Row bank 2. Each bank is further divided into two subbanks; an Even Pixel bank and an Odd Pixel bank. The output of the camera even pixel FIFOs 1920 is written to the Even Pixel bank, the camera odd pixels FIFOs 1910 are written to the Odd Pixel bank. Each frame of camera data is alternately written to the Even Row bank and the Odd Row bank. The first frame written to the memory array after system reset or power-up is written to the Even Row bank. At intervals dictated by programmable Almost Empty Flag signals from the output FIFOs 1940, 1950, the DSP 1960 reads the scan pattern from the memory array. The data read by the DSP 1960 is written to the output FIFOs 1940, 1950, via the tri-state buffers 1965, 1970. The even pixels are written to the even output FIFO 1950 and the odd pixels are written to the odd output FIFO 1940. The data of the even and odd output FIFOs are read on alternate clock cycles at a predetermined clock rate, for example 4.096 MHz, under control of the control logic and address control unit 1975. The interleaved data is written to a D/A converter (not shown). The analog output of the D/A is sent to an analog based digitizer with active filtering and threshold detection designed for use with a decoder (not shown), such as a Surescan 990 decoder manufactured by PSC Inc. The D/A stage can be bypassed and the raw 8 bit pixel values would then be sent to an appropriate decoder.

Maintaining separation of the even and odd pixels throughout the raster conversion module offers several advantages.

The amount of physical memory required for the memory array can be reduced. It has been previously shown that a camera with 2048 pixels digitized to 8 bits would require a memory array of 2048 bytes per row×2048 rows, or 4.2 Mbytes of physical memory. With the separation of the even and odd pixels, the physical memory of the memory array can be reduced by half. By starting each leg of the pattern in an even row, only the even pixels of the even rows and the odd pixels of the odd rows need to be stored. This reduces the memory required for the above example from 4.2 Mbytes to 2.1 Mbytes per camera.

The raster conversion module can operate at higher frame rates. The data from the odd and even pixel input FIFOs can be written to memory in parallel, thereby doubling the frame rate a particular speed grade of RAM can handle. For example, the first word of a frame being read into memory from the input FIFOs, where the pixels are digitized as 8 bits, would be 16 bits wide and be composed of the 8 bit values for pixels 0 and 1. The second word would also be 16 bits wide and would represent pixels 2 and 3 and so on for the entire frame.

Figure 13:
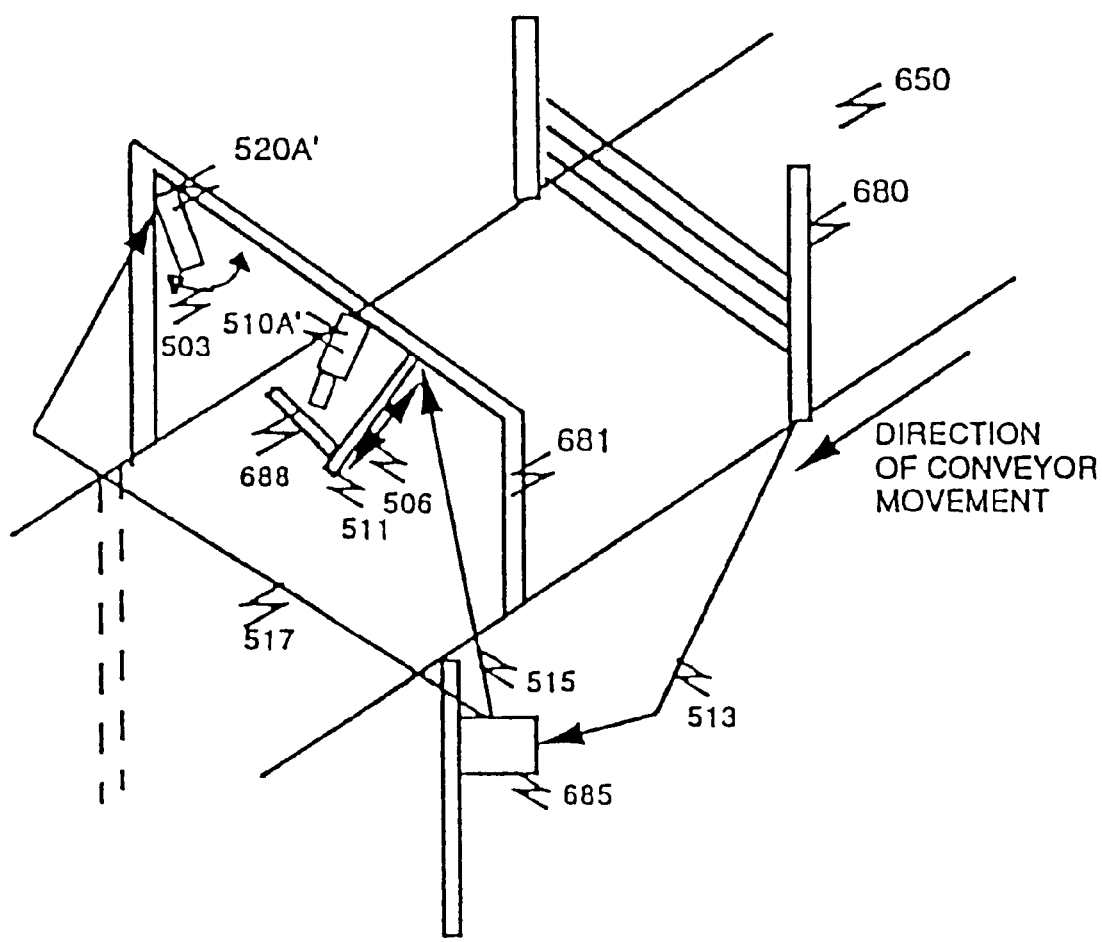
FIG. 13 shows in block diagram form a bar code scanning device according to a second embodiment of the invention, when viewed from above a conveyor.

A second embodiment of the invention will now be explained with reference to FIGS. 13 and 14. In FIG. 13, instead of the laser light sources and CCD-based cameras being positioned in a gap beneath the conveyors 610, 620, a laser light sources 520A' and a CCD-based camera 510A' are instead positioned above a conveyor 650. In the second embodiment, the laser light source 520A' is positioned to output light towards a top surface of the conveyor 650. Before any object travelling on the conveyor 650 passes through a region covered by the laser light source 520A', it first passes through a height measuring unit 680, which determines a height of the object. The height measuring device may be constructed as a light curtain array or other type of height measuring device. A light curtain array that can be utilized in the system according to the second embodiment is disclosed in U.S. patent application Ser. No. 08/507,625, filed Jul. 26, 1995, of Mark Woodworth, and assigned to PSC Inc., which is incorporated in its entirety herein by reference.

The height measuring unit 680 outputs a signal on line 513 to a processing unit 685, where the signal 513 is indicative of the height of an object passing by the height measuring unit 680. Based on the signal 513 received from the height measuring unit 680, the processing unit 685 outputs a first signal 515 to position the optics 688, and outputs a second signal 517 to position the laser light source 520A'. As is known to one of ordinary skill in the art, the laser light source 520A' is provided with a cylindrical lens (not shown), so as to change a "dot" of light output from the laser into a "line" of laser light Based on the second signal 517, the laser light source 520A' is rotated to a position so as to shine light optimally onto the top surface of the object on the conveyor. Based on the first signal 515, the optics 688 provided for the CCD-based camera 510A' moves either upward or downwards, so as to properly focus the return light from a particular distance, with that particular distance corresponding to the top surface of the object passing beneath the CCD-based camera 510A'.

As shown in FIG. 13, both the CCD-based camera 510A' and the laser light source 520A' are positioned on a housing 681 that is in the form of a U-shape on the conveyor 650. Optics 688 are slidably attached to a structure 511, where optics 688 either move up or down on the structure 511 depending on the signal 515 output from the processing unit 685. Laser light source 520A' is rotatably positioned based on the signal 517 output from the processing unit 685. Other types of configurations for providing movement of optics with respect to a stationary CCD-based camera may be utilized while remaining within the scope of the invention as described herein. For example, the optics 688 may be included in a lens portion of the CCD-based camera 510A', which is rotated either clockwise or counterclockwise in order to be focused to a particular distance from the CCD-based camera 510A'.

Figure 14:
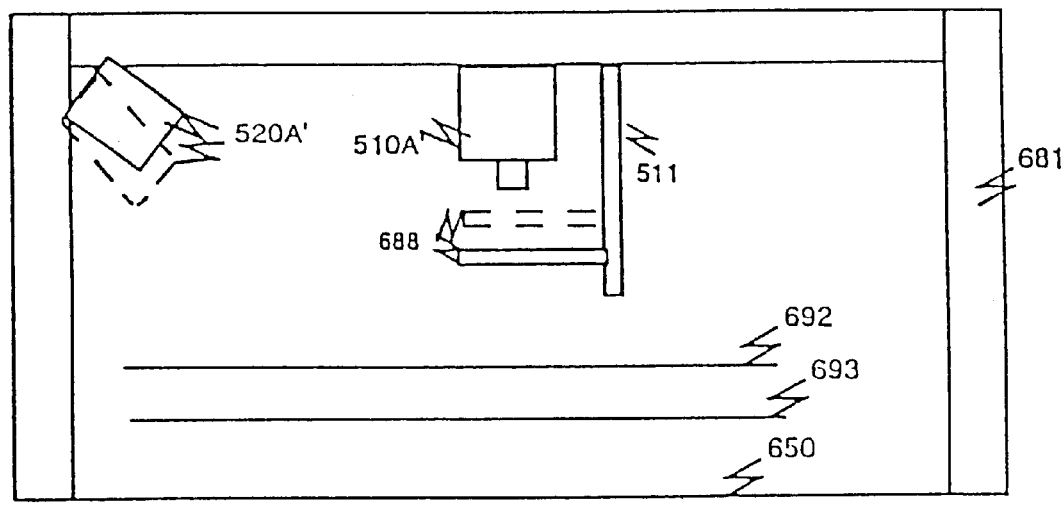
FIG. 14 shows the laser light source and the CCD-based camera being positioned in either of two positions, according to the second embodiment of the invention, when viewed directly in front or in back of conveyor.

FIG. 14 shows a first line 692 corresponding to an object having a first height, and a second line 693 corresponding to an object having a second height smaller than the first height. When an object having the first height passes by the height measuring unit 680, a signal 513 is output from the height measuring unit 680 to the processing unit 685 which is indicative of the first height Based on the current speed of the conveyor and the distance that the height measuring unit 680 is from the area where the laser light source 520A' and CCD-based camera 510A' are disposed (both known to the processing unit 685), the processing unit 685 can readily determine a time when the object having the first height will pass beneath the laser light source 520A' and CCD-based camera 510A'. Before this time, the processing unit 685 outputs the first and second signals 515, 517, so as to correctly position the laser light source 520A' and the optics 688 provided between the CCD-based camera 510A' and the conveyor 650. The position of the laser light source 520A' and the position of the optics 688 for an object having a height corresponding to line 692 are shown by the standard lines in FIG. 14. With this positioning, the system according to the second embodiment is ready to read a bar code label or other information on the top surface of the object beneath it, with that top surface corresponding to the first line 692. Rotational movement of the laser light source 520A' is shown by the double-sided arrow 503 in FIG. 13, and linear movement of the optics 688 is shown by the double-sided arrow 506 in FIG. 13.

After the first object passes beneath the system according to the second embodiment, the system can then be repositioned for another object, such as a second object that has a second height as given by the second line 693. The height of the second line 693 is determined by the height measuring unit 680, and this information is sent to the processing unit 685. In this case, the laser light source 520A' is rotated downwardly (to a position shown by phantom lines in FIG. 13) so that it shines light onto a region around the second line 693, and the optics 688 is moved upwardly (to a position shown by phantom lines in FIG. 14) so as to adjust the focusing point of the light collection system to be at or around the second line 693.

Thus, in the second embodiment, the system maintains a same resolution for objects that have differing heights, and thus are different distances away from the system. While the description was given for a system disposed directly above a conveyor, the system according to the second embodiment may also be utilized for other positions around the conveyor, such as to a side of a conveyor. In that case, the distance that the object is with respect to the side of the conveyor can be determined prior to the object passing by the scanning system, such as in a manner disclosed in U.S. patent application Ser. No. 08/507,625. The system according to the second embodiment provides an autofocusing for objects as they pass by, based on rotational movement of laser light sources and linear movement of optics provided for CCD-based cameras. Another type of autofocusing system is described in U.S. Pat. No. 5,317,166, issued to Benny Tafoya, and assigned to PSC Inc., which is incorporated in its entirety herein by reference. In the system of U.S. Pat. No. 5,317,166, however, there is no use of CCD-based cameras, such as in the present invention. Although the second embodiment is described and shown in the figures with respect to the use of one laser light source and one CCD-based camera, the system may also be configured with a plurality of laser light sources and CCD-based cameras, with each pair covering a particular widthwise area on the conveyor. With this configuration, labels on the top as well as the sides of an object passing below the laser light sources and CCD-based cameras may be read and decoded.

Figure 15:
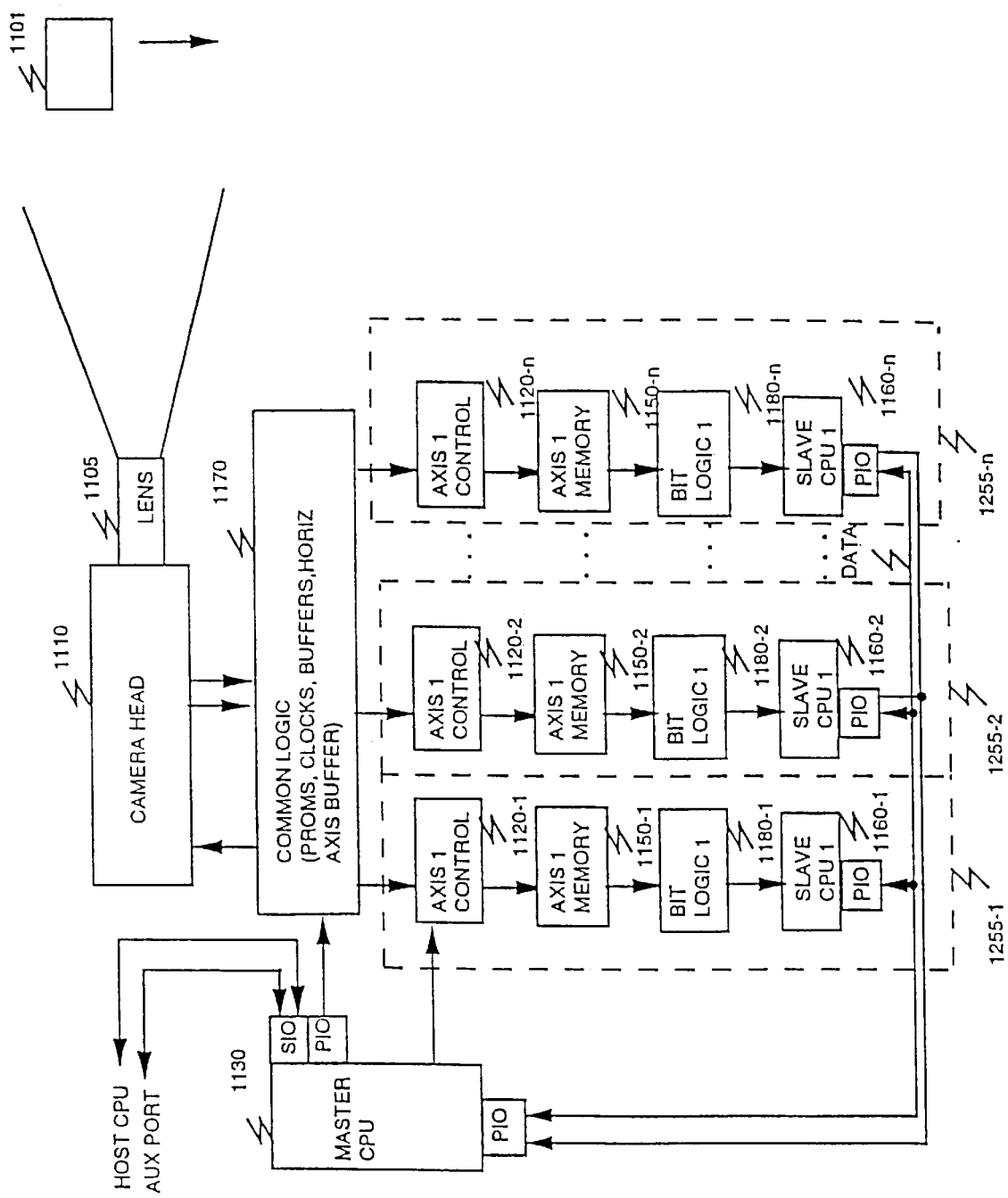
FIG. 15 shows in block diagram form a bar code scanning device according to a third embodiment of the invention.

A third embodiment of the invention will now be explained with reference to FIGS. 15–17. In FIG. 15, subsets of the pixel data from a CCD camera 1110 are provided to axis controllers 1120-1 to at 1120-n, via a common logic unit 1170. The pixel data that is temporarily stored in Common Logic Unit 1170 is the result of return light from a particular region covered by the CCD camera 1110. As shown in FIG. 15, an object 1101 is within the particular region covered the CCD camera 1110.

CCD camera 1110 is capable of outputting a matrix array of data at periodic instants in time, and thus corresponds to a two-dimensional CCD camera. The array may be an n×n array, or an m×n array of pixel elements, where m and n are integers. Common logic unit 1170 provides the logic for temporarily storing data from the CCD camera head 1110, and may be configured as a plurality of buffers 1400-1 to 1400-n that are docked by a dock signal 1420 to receive data from the CCD camera head 1110, as in FIG. 16.

In the second embodiment, common logic unit 1170 includes a 1028-bit×1028-bit memory array, which stores pixel data from the CCD camera 1110 at periodic time instants. The memory array may be configured as a plurality of buffers, as shown in FIG. 16, or it may be configured as a random access memory that is updated at periodic instants in time, or by any other temporary storage device, as is known to one of ordinary skill in the art.

A master CPU 1130 initializes each of the axis controllers 1120-1 to 1120-n, so that each axis controller extracts "pertinent data" of the pixel data read by the CCD cameras on each scan, and stores the pertinent data into a proper location in a corresponding axis memory 1150-1 to 1150-n. As shown in FIG. 15, each axis 1255-1 to 1255-n has an associated axis controller, an associated axis memory, an associated bit logic unit, and an associated slave processor. Each axis 1255-1 to 1255-n may be configured as a separate axis card, as shown by the dashed lines in FIG. 15.

The master CPU 1130 loads each axis controller with a reload value that will cause a trigger to be generated by a counter (not shown) internal to each axis controller, at the proper rate for each scan on that axis. Each counter is initially loaded with a count that ensures the proper delay for the first detection. For example, a 45-degree axis controller will trigger on the first data bit on the first linear scan line, the second data bit on the second linear scan line, the third linear data bit on the third linear scan line, etc. Since parts of many 45-degree scans will be found on the scan line, the counter will ensure that they are found at regular intervals after the first scan.

Next, the repeat count for each axis controller is initialized by the master CPU 1130. On certain scan lines, such as horizontal scan lines, it is necessary to write sequential points on the same line. For this reason, some of the axis controllers 1120-1–1120-n have a counter that causes sequential writes to occur following a trigger. This function is initialized prior to a scan.

Next, each axis has its associated scan counter initialized. The first trigger point a given axis find on any given line may not be the zeroth scan for that axis. For example, the first data point on the first scan will be used by the 45 degree axis controller, but may not necessarily be the first 45 degree scan. It may, however, become the center scan when the generation is complete. For this reason, the number of the first scan must be loaded prior to initiation of the scanning operation.

When a scan is initiated, a 1028 by 1028 array of pixel data is received from the read head of the CCD camera 1110. As the data is returned from the read head of the CCD camera 1110, a position clock is returned as well. This position clock is used to advance the counter of each of the axis controllers. The position clock is used to determine which scan the data currently stored in the common logic unit 1170 corresponds to.

Figure 16:
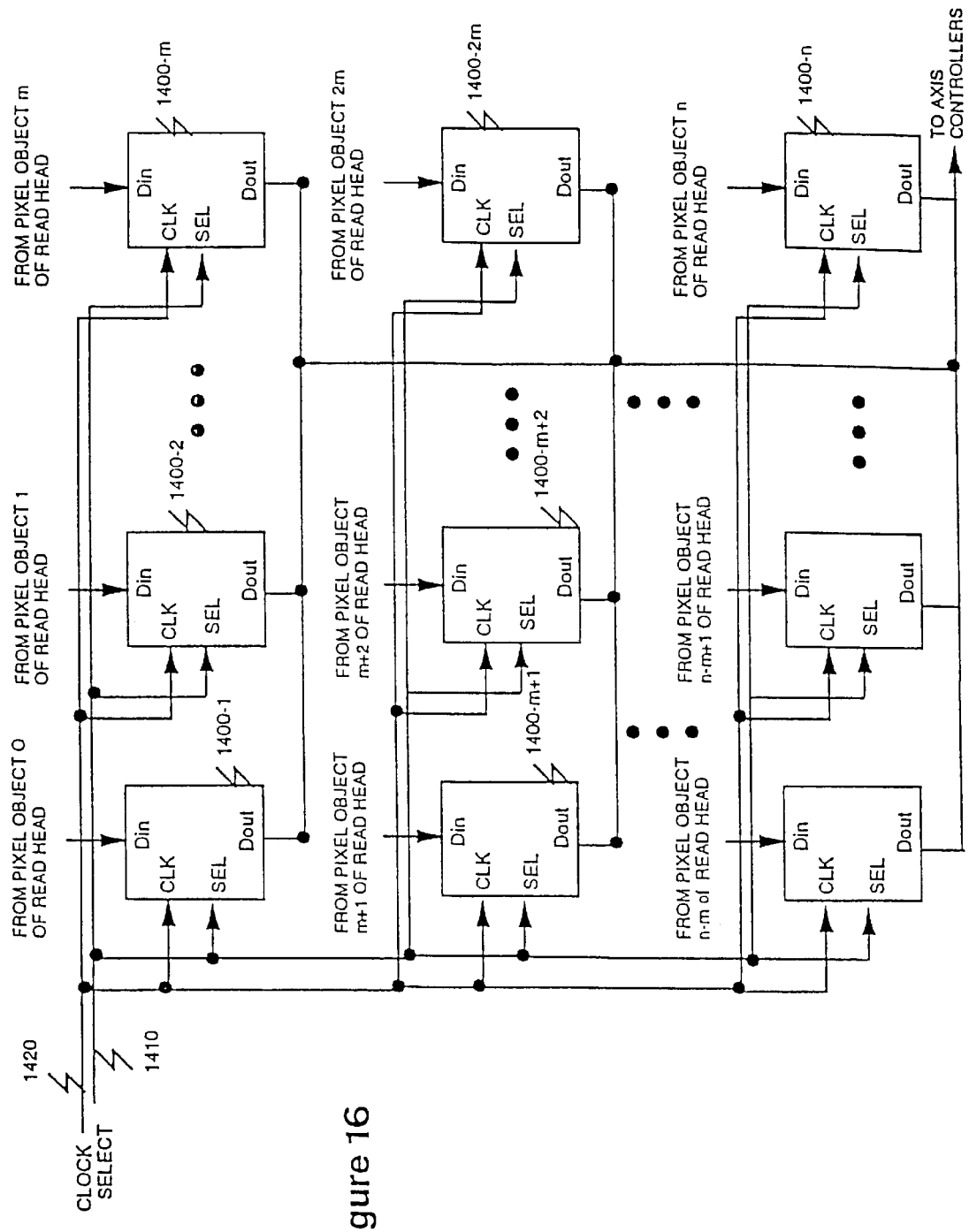
FIG. 16 shows a configuration of a memory portion of the common logic unit according to the third embodiment of the invention.
Figure 17:
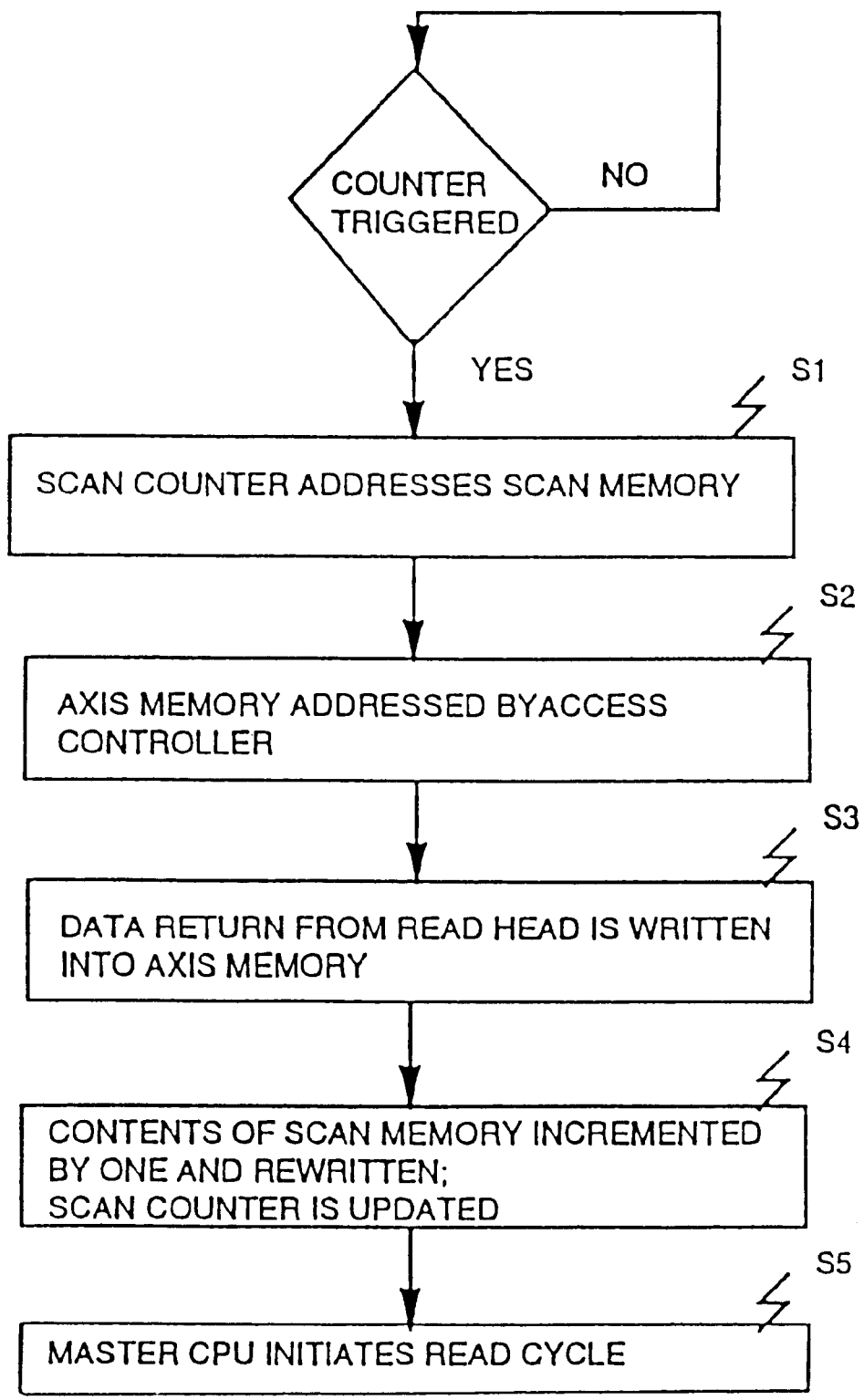
FIG. 17 is a flow diagram of the steps performed for the bar code scanning ice according to the third embodiment.

When a counter for any of the axis controllers 1120-1–1120-n is triggered, the following steps occur, as shown in FIG. 17. In a first step S1, the counter for each axis controller sequentially addresses the temporarily-stored data in the common logic unit 1170 via the select line 1410, as shown in FIG. 16. A counter for reading data into the corresponding axis memory is initialized to zero on a read operation that follows the scan.

In a second step S2, an axis memory 1150-1–1150-n associated with the axis controller is addressed by the axis controller to determine which scan is being written, and to determine where in the scan the bit belongs.

In a third step S3, data from predetermined memory locations (or buffers) returned from the read head of the CCD camera 1110 are now written sequentially into the axis memory.

In a fourth step S4, the contents of the common logic unit 1170 are incremented by one and rewritten. If an axis controller is not required to write multiple sequential locations from a same scan line, the scan counter associated with the axis controller is incremented. It now addresses the next location in the scan memory, and is ready for the next trigger. In the event that a multiple write is required, the write is repeated each clock period until the required number of writes takes place. The scan counter is then updated.

In a fifth step S5, the master CPU 1130 initiates a read cycle. In the second embodiment, no memory refresh cycle is required, as the data is read only once, and this will take place within the maximum refresh period for the memory.

During the read cycle that takes place during the fifth step S5, a bit logic unit 1180-1 to 1180-n for each axis will rapidly read all sequential memory locations within it associated the axis memory. As each location is read, a count is generated of the time since the last data transition. Each time a data transition is detected, the count since the last transition is passed to an associated slave processor 1160-1 to 1160-n.

Each slave processor 1160-1 to 1160-n utilizes the information retrieved from its corresponding bit logic unit 1180-1 to 1180-n in order to determine if a potentially valid bar code may have been read. This determination is based on known characteristics of bar code labels, such as quiet zone size, minimum width and maximum width bar code sizes, etc. If the information retrieved from the corresponding bit logic unit is such that the data cannot correspond to a true bar code, then that data is not sent to the master CPU 1130 for decoding. If, however, the data can possibly be a true bar code, then that data is sent to the master CPU 1130 for decoding.

Each slave processor 1160-1–1160-n is polled by the master CPU 1130 in a periodic manner, and if a potential bar code has been located, it will be passed to the master CPU 1130 for decoding. Each slave processor is connected to its corresponding bit logic unit 1180-1–1180-n, which is itself connected to its corresponding axis memory 1150-1–1150-n. In the third embodiment, each bit logic unit 1180-1–1180-n corresponds to a first-in, first-out buffer (FIFO), where bar widths and bar spaces are stored as 8-bit wide elements in the 9-bit×256-bit FIFO. That is, consecutive ones correspond to a particular bar width, and consecutive zeros correspond to a particular space width. The ninth bit for each storage location in the bit logic unit corresponds to a quiet-zone bit The quiet-zone bit indicates whether or not a quiet-zone has been scanned. Other configurations of the bit logic unit may be envisioned by one of ordinary skill in the art, while remaining within the scope of the invention as described herein.

During intervals in which no bar codes are detected, the master CPU 1130 will place all axis controllers in a "horizontal" mode, and may initiate practice scans with artificial data, if desired. The slave processors 1160-1 to 1160-n will verify that all of the data is correct, and report this to the master CPU 1130. Both the slave processors 1160-1 to 1160-n and the master CPU 1130 may run internal diagnostics when not actively scanning the read data.

As shown in FIG. 15, both the slave processors 1160-1 to 1160-n and the master CPU 1130 have a corresponding parallel input/output (PIO) port, for transmitting and receiving data between the master CPU and the slave processor. The master CPU 1130 sends control signals to the common logic unit 1170 via another PIO port, and communicates with a host CPU (not shown) and an auxiliary port (not shown) via a serial input/output (SIO) port.

Referring now to FIG. 16, each buffer of the common logic unit 1170 is sampled based on a select signal and a clock signal. For example, for a 45 degree scan line, the leftmost buffer 1400-1 on the top row is sampled at a time to and output to the axis controller for the 45 degree axis, the next-to-leftmost buffer 1400-(m+2) on the second row is sampled at a time $t_{m+2}$ and output to the axis controller for the 45 degree axis, and so on. The sampling of each of the buffers is performed at a fast enough rate so that all of the buffers are sampled prior to a next scan (and therefore reloading) of data into the common logic unit 1170. For a horizontal scan line, each of the buffers in the top-most row are sampled consecutively, with the sampled data being forwarded to the axis memory of the horizontal axis. Of course, other horizontal scan lines may also be created at the same time, by taking data from each of buffers in other row of the common logic unit 1170. Thus, for the 45 degree scan line, the count value of "1" causes the output of the buffer 1400-1 to be sent to the axis controller for the 45 degree scan line, the count value of "m+2" causes the output of the buffer 1400-(m+2) to be output to the axis controller for the 45 degree scan line, and so on. Each buffer is separately addressable based on a current state of the multi-bit select line 1410, and each buffer is clocked to receive new data from the CCD-based camera 1110 based on the clock signal line 1420.

The "count" for each axis is different based on the scan line to be created for that axis. The count progresses from left to right, starting at the topmost row of the buffers in the common logic unit 1170, and proceeding down to the rightmost buffer in the last row of the common logic unit 1170. The count is completed (e.g., select line 1410 transitions from 0 to n in units of 1) prior to data from a next scan being written into the buffers. Data is read into the buffers at a time corresponding to a next clock pulse on the clock line 1420. The clock rate is thus slower than the select rate, and in the third embodiment is at least 1/n as slow.

The third embodiment is described having n axes, with n being an integer value that corresponds to the number of simultaneous different scan lines that are created from the data output from the CCD-based camera 1110. The value n may be preset to a value, such as 16, or it may be set to a value based on a particular bar code to be detected and decoded. For example, the number of different scan lines may be set based on the minimum height of a bar of a bar code label, with more scan lines being utilized for a smaller minimum-height bar code label. In the third embodiment, a bar code label may be decoded irrespective as to the orientation of the bar code label with respect to the CCD-based camera 1110, since a plurality of different virtual scan lines are created from the two-dimensional array of pixel data output by the CCD-based camera 1110.

While embodiments have been described herein, modification of the described embodiments may become apparent to those of ordinary skill in the art, following the teachings of the invention, without departing from the scope of the invention as set forth in the appended claims. For example, the second embodiment can be utilized with a "rematch" technique for determining bar codes based on partial scans of a bar code label, as described in U.S. Pat. No. 5,481,097, issued to Benny R. Tafoya, which is assigned to PSC Inc., and which is incorporated in its entirety herein by reference. In the rematch technique, two separate scan lines are utilized to decode a bar code label, where data from one scan line is used to decode a first portion of the label, and where data from the other scan line is used to decode a remaining second portion of the label.

What is claimed is:

1. An apparatus for scanning a bar code label, comprising:

at least one CCD camera configured to provide a linear array of scan output corresponding to a particular region currently being scanned;

a memory for storing the linear array of scan output from the at least one CCD camera;

a controller connected to the at least one CCD camera and configured to output the linear array of scan output to a particular region of the memory;

a signal processor connected to the memory and configured to output data from particular memory locations of the memory so as to create at least one virtual scan line; and a decoder configured to determine if data corresponding to the virtual scan line corresponds to a real bar code, wherein the virtual scan lines correspond to two 45 degree lines that intersect with each other so as to form an X-shape scan pattern, as well as a horizontal line that provides redundancy data for the decoder.

2. The apparatus according to claim 1, wherein the controller provides a write location signal to the signal processor, indicating where in the memory the controller is currently writing to.

3. An apparatus for scanning a bar code label, comprising:

at least one CCD camera configured to provide a linear array of scan output corresponding to a particular region being scanned;

a memory for storing the linear array of scan output from the at least one CCD camera, the memory being divided into a first memory region for storing even rows of pixel data and a second memory region for storing odd rows of pixel data with respect to pixels of the at least one CCD camera;

a controller connected to the at least one CCD camera and configured to output the linear array of scan output to the memory;

a signal processor connected to the memory and configured to output data from particular memory locations of the memory so as to create at least one virtual scan line;

an input FIFO unit that includes an even input FIFO unit for receiving the even row of pixel data from the even pixels of the at least one CCD camera, and an odd input FIFO unit for receiving the odd rows of pixel data from the odd pixels of the at least one CCD camera; and a decoder configured to determine if data corresponding to the virtual scan line corresponds to a real bar code, wherein the first memory region is further subdivided into a first even pixel bank and a first odd pixel bank, wherein the second memory region is further subdivided into a second even pixel bank and a second odd pixel bank, wherein consecutive frames of camera data output by the even input FIFO unit are alternately stored, on a frame by frame basis, in the first even pixel bank and the second even pixel bank, and wherein consecutive frames of camera data output by the odd input FIFO are alternately stored, on a frame by frame basis, in the first odd pixel bank and the second odd pixel bank.

4. The apparatus according to claim 3, further comprising:

a tri-state buffer unit that includes an even tri-state buffer unit and an odd tri-state buffer unit; and an output FIFO unit that includes an even output FIFO unit for receiving even pixel data from the first memory region via the even tri-state buffer, and an odd FIFO unit for receiving odd pixel data from the second memory region via the odd tri-state buffer, data being sent to the output FIFO unit under control of the controller.

* * * * *